July 30, 1935.    E. F. HATHAWAY ET AL    2,009,797
RUG DISPLAY MECHANISM
Filed May 31, 1932    9 Sheets-Sheet 2
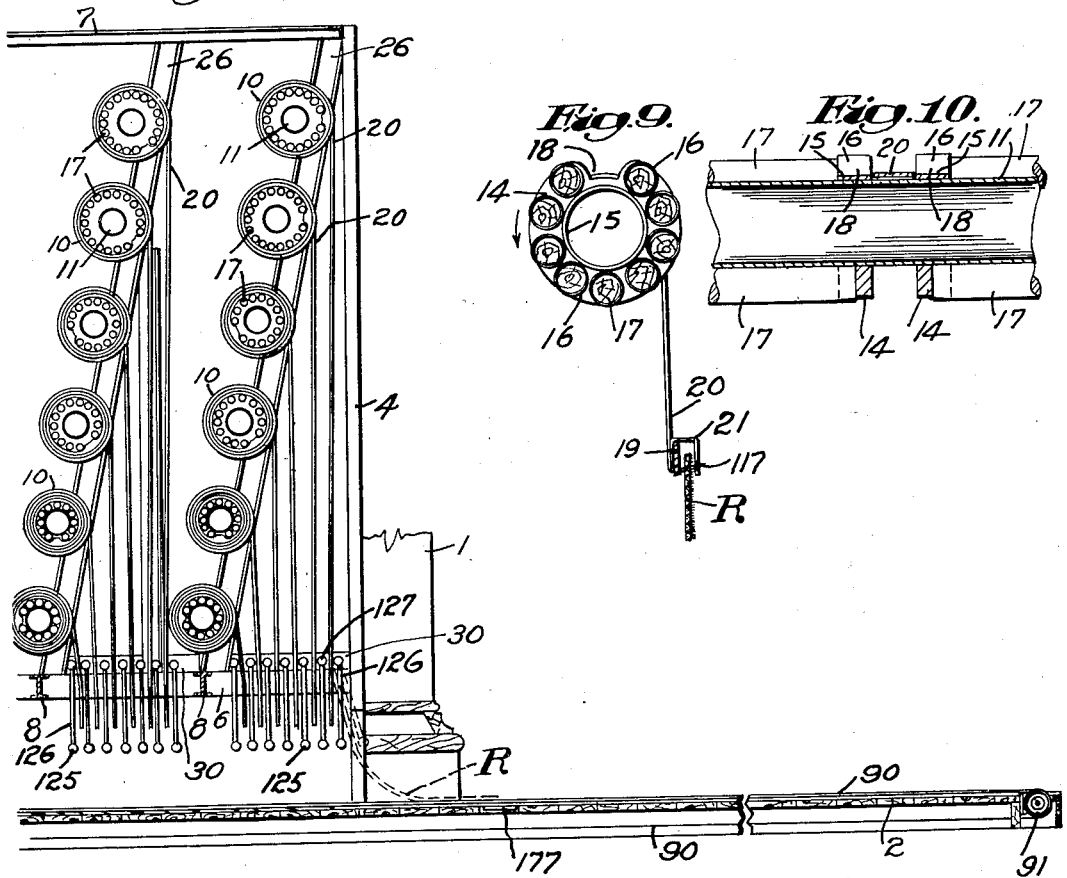
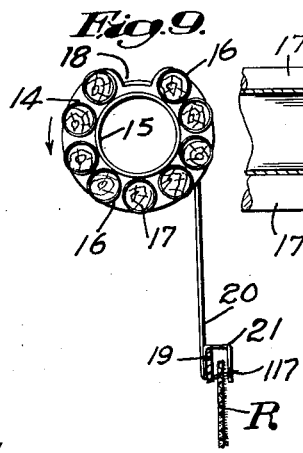
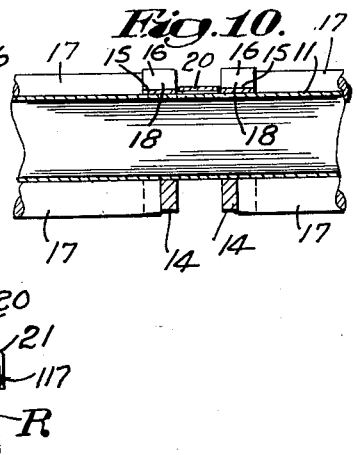
Inventors:
Edgar F. Hathaway,
Walter Bixby,
by Emery, Booth, Varney & Townsend
Attys

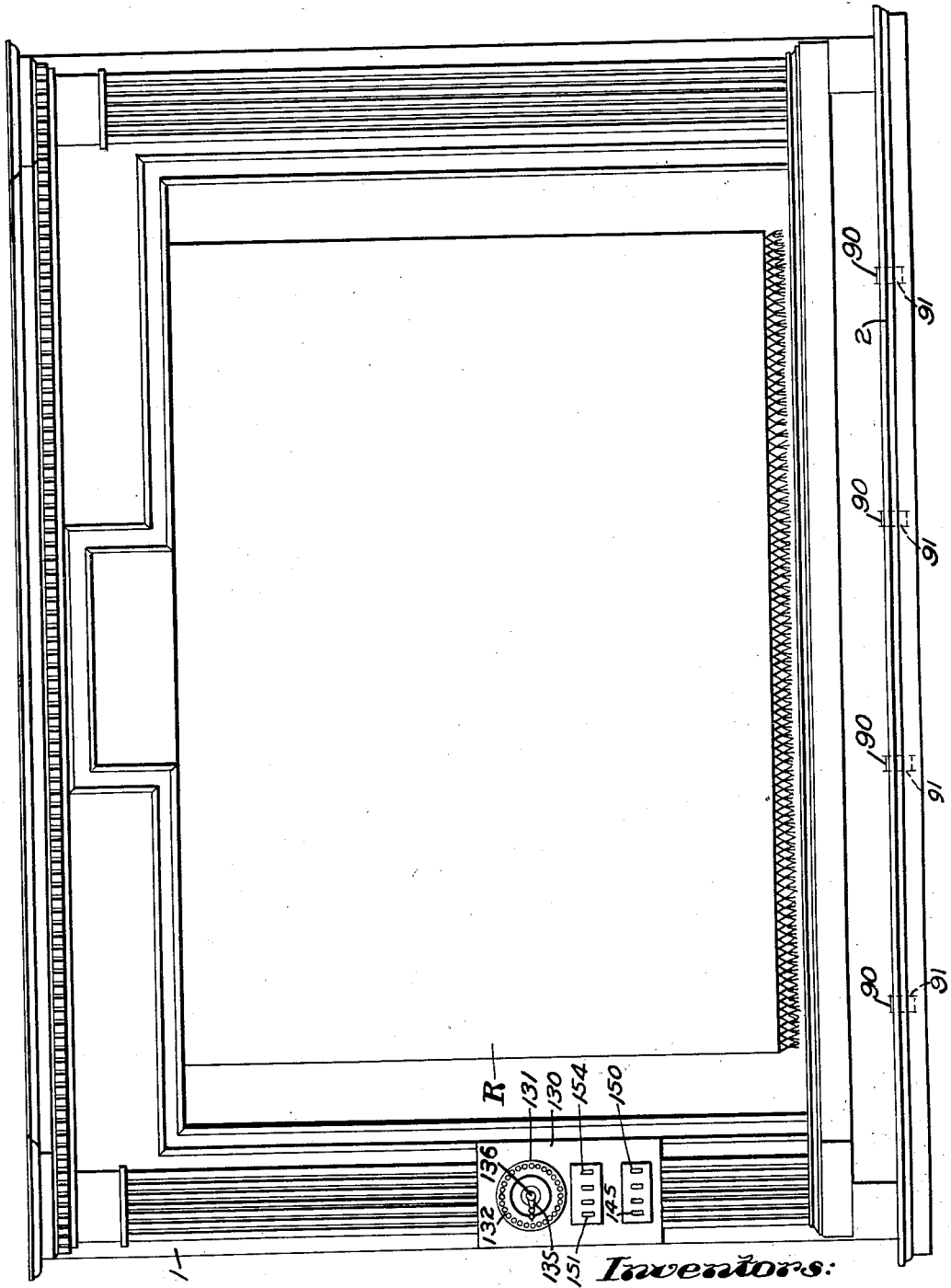

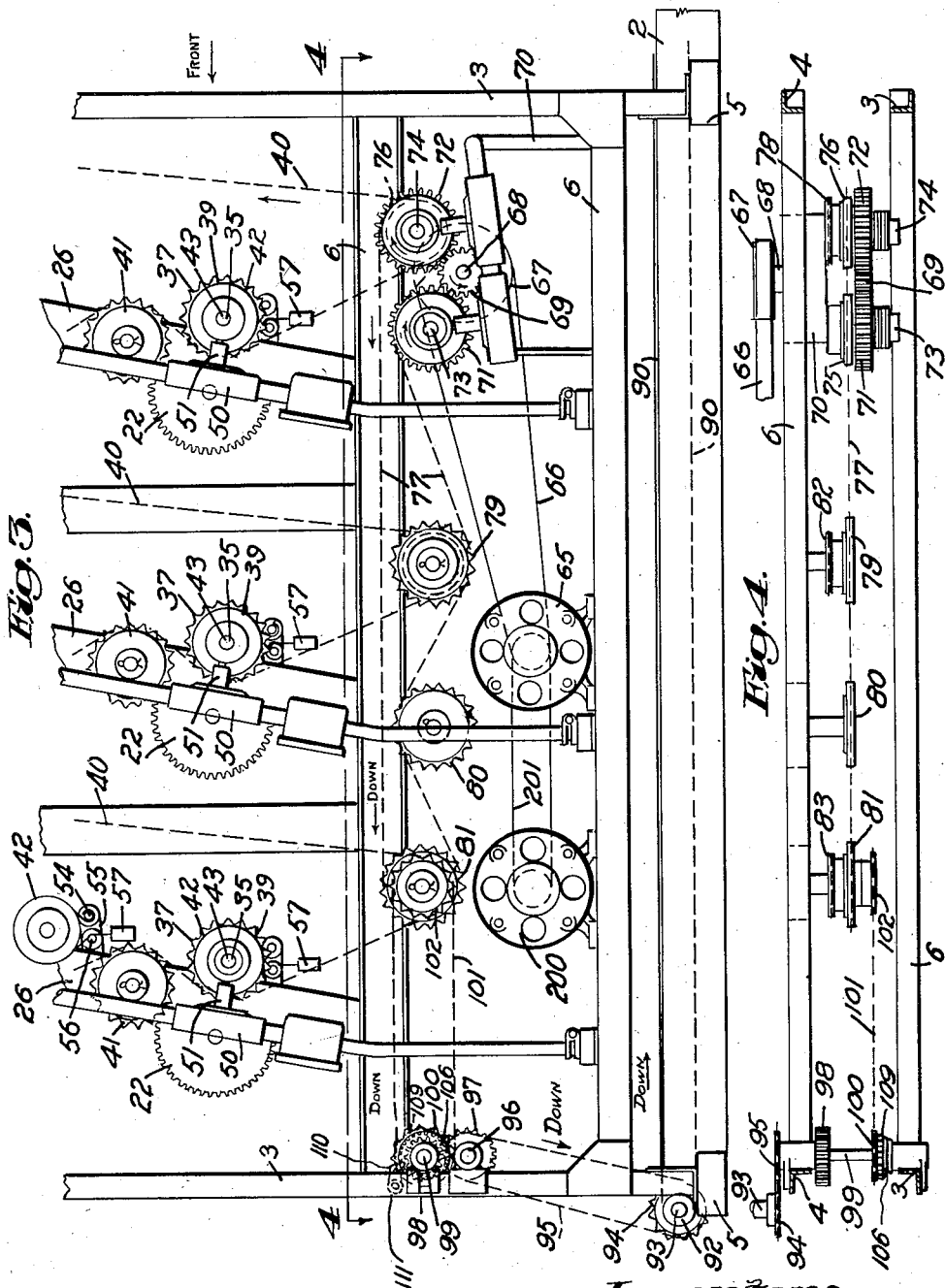

July 30, 1935.  E. F. HATHAWAY ET AL  2,009,797
RUG DISPLAY MECHANISM
Filed May 31, 1932  9 Sheets-Sheet 4
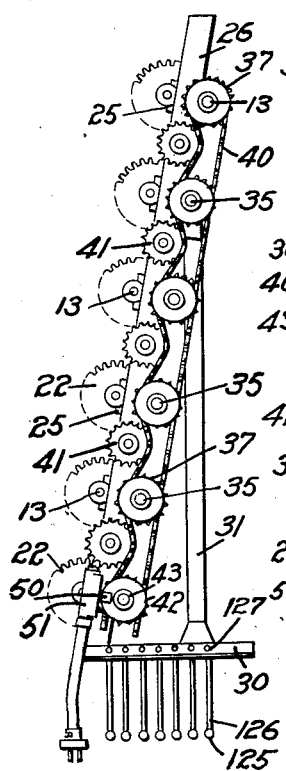
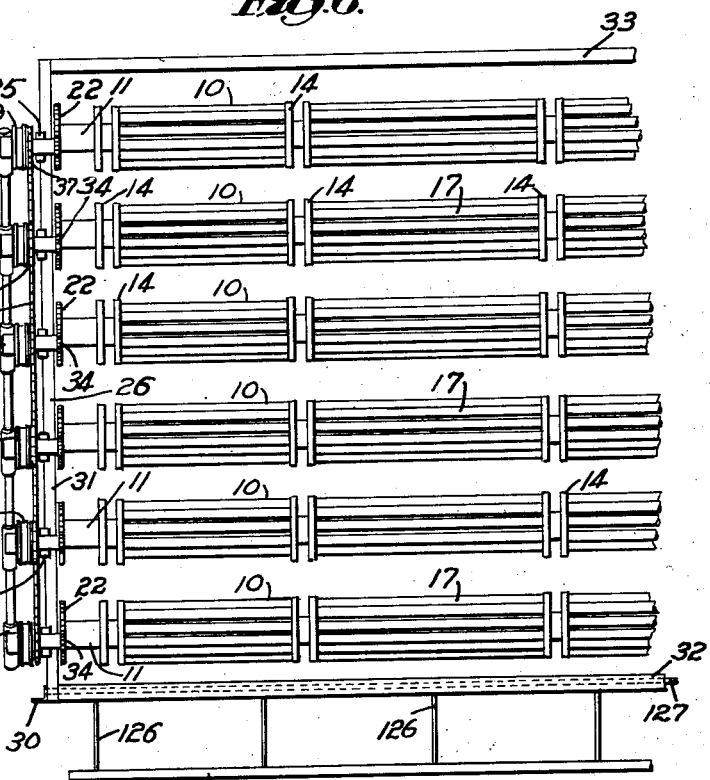

July 30, 1935.  E. F. HATHAWAY ET AL  2,009,797
RUG DISPLAY MECHANISM
Filed May 31, 1932  9 Sheets-Sheet 5
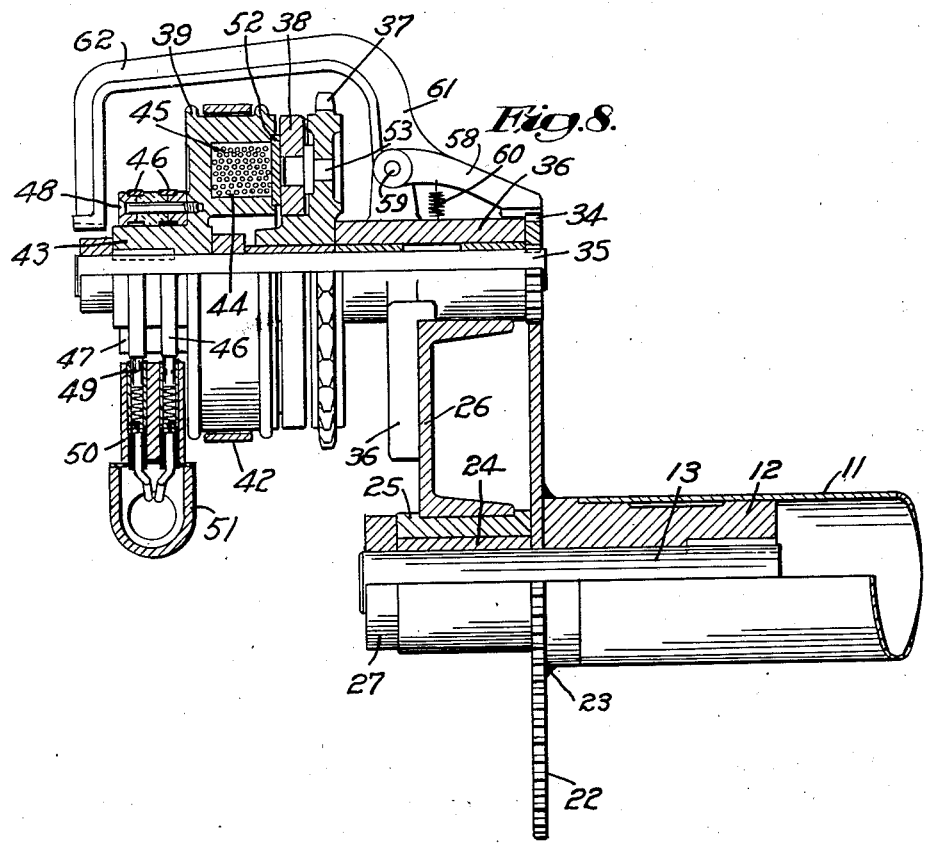
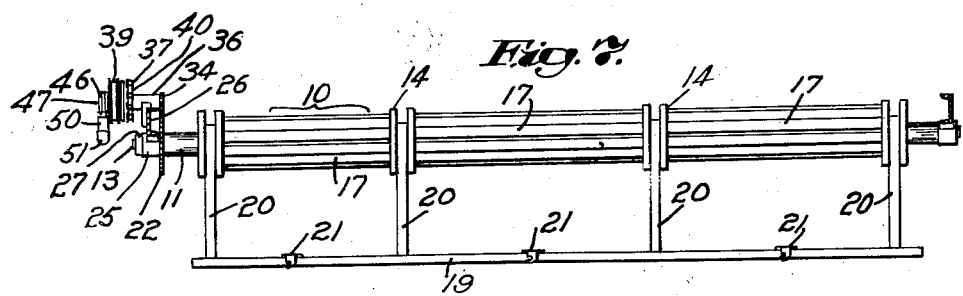
Inventors:
Edgar F. Hathaway,
Walter Bixby,
by Emery, Booth, Varney & Townsend
Attys July 30, 1935.  E. F. HATHAWAY ET AL  2,009,797
RUG DISPLAY MECHANISM
Filed May 31, 1932  9 Sheets-Sheet 6
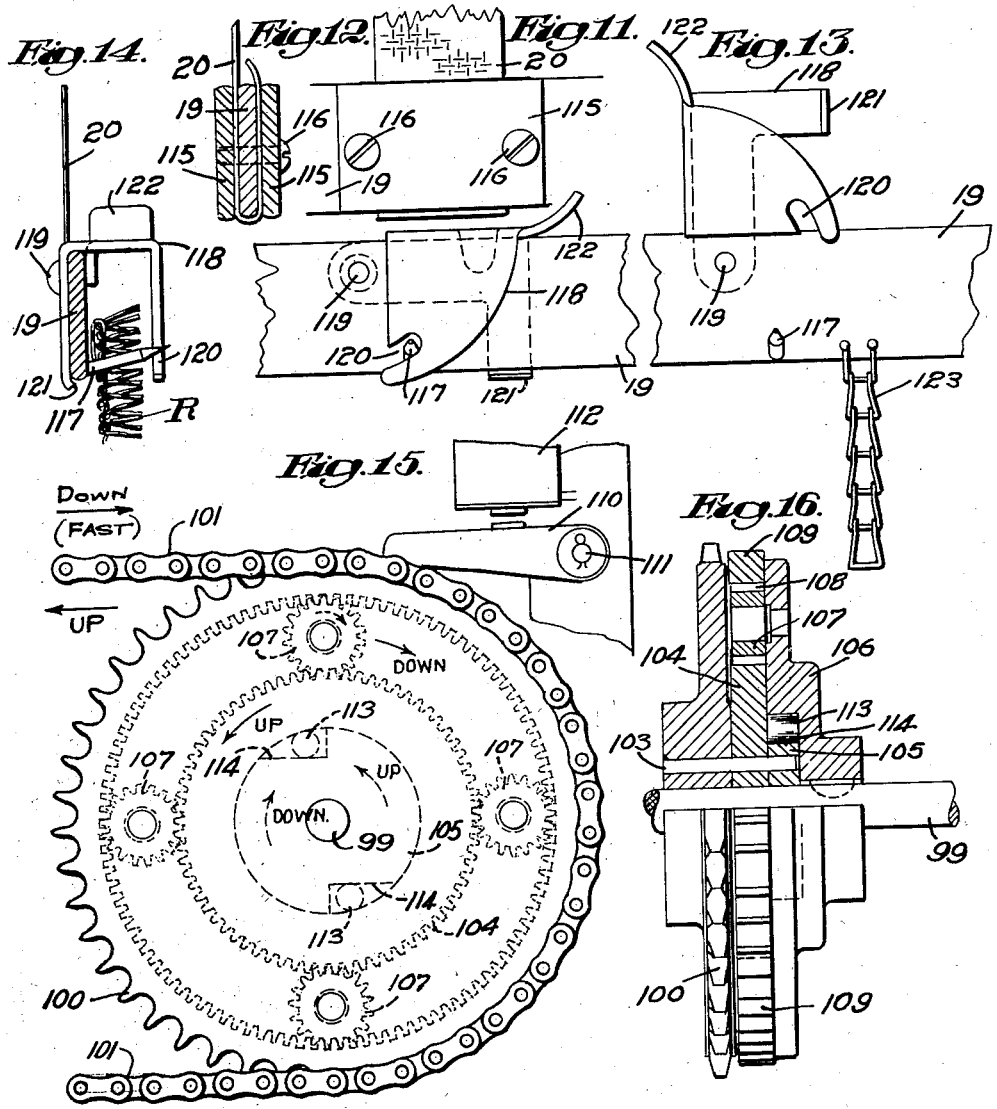
Inventors:
Edgar F. Hathaway,
Walter Bixby,
by Emery, Booth, Varney + Townsend
Attys July 30, 1935.   E. F. HATHAWAY ET AL   2,009,797
RUG DISPLAY MECHANISM
Filed May 31, 1932   9 Sheets-Sheet 7
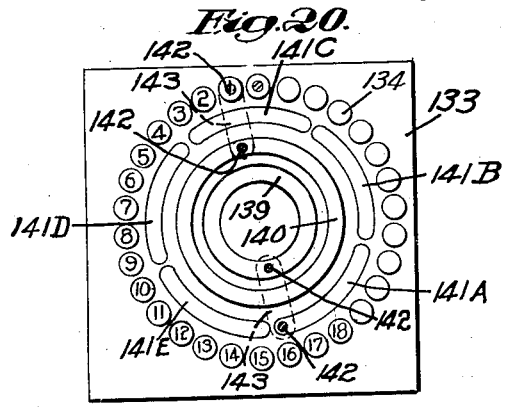
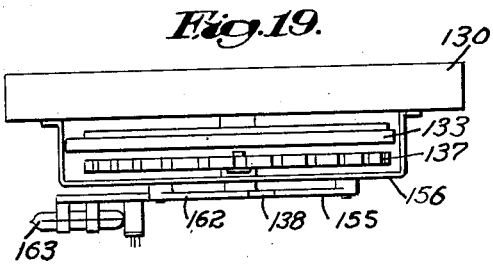
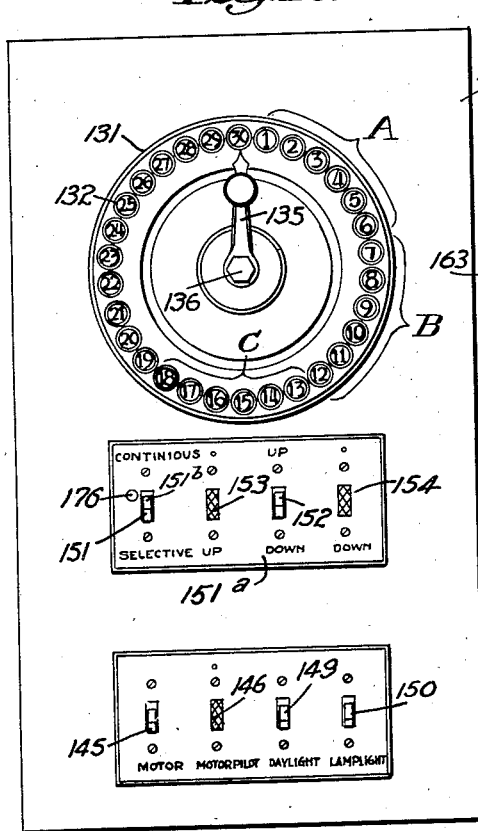
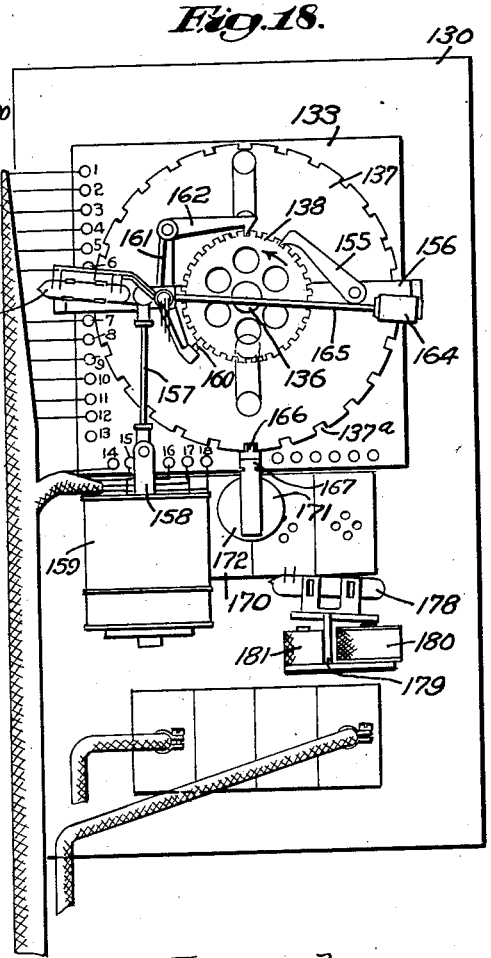
Inventors:
Edgar F. Hathaway,
Walter Bixby,
by Emery, Booth, Varney & Townsend
Attys

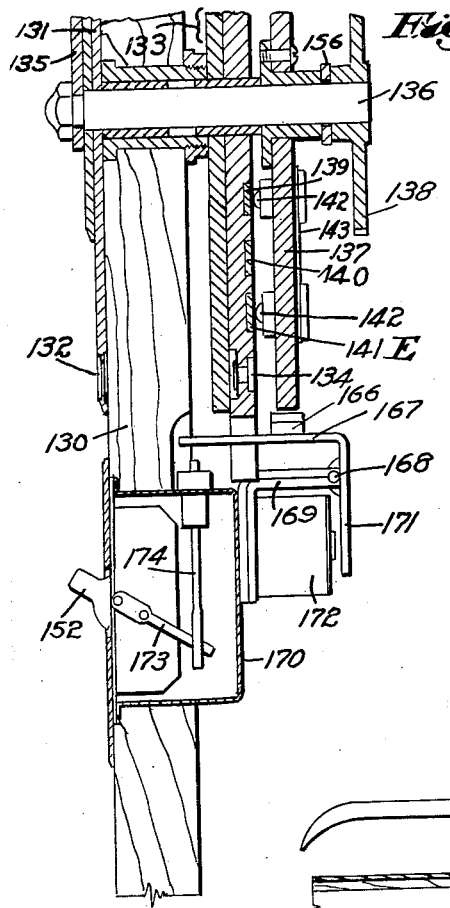
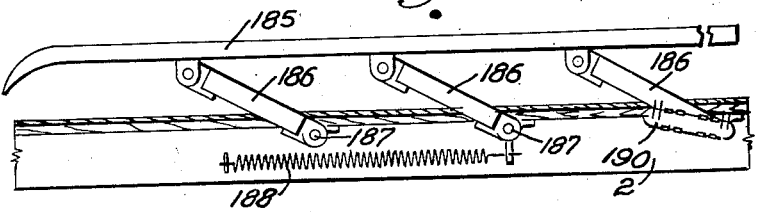
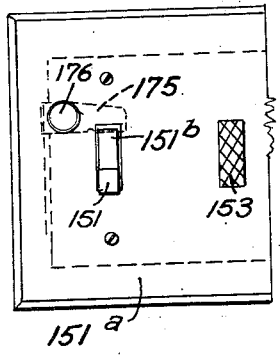
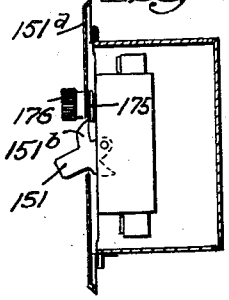

July 30, 1935.  E. F. HATHAWAY ET AL  2,009,797
RUG DISPLAY MECHANISM
Filed May 31, 1932  9 Sheets-Sheet 9

Inventors:
Edgar F. Hathaway,
Walter Bixby,
by Emery, Booth, Varney & Townsend
Attys Patented July 30, 1935

2,009,797

UNITED STATES PATENT OFFICE 2,009,797

RUG DISPLAY MECHANISM

Edgar F. Hathaway, Wellesley, and Walter Bixby, Dorchester, Mass.

Application May 31, 1932, Serial No. 614,468

91 Claims. (Cl. 40—52)

Our invention relates to the storage and display of bulky sheet articles such as rugs, carpets and the like, and includes novel methods and means for effecting such storage and display, with control at the will of the exhibitor or automatically. In certain respects the present invention is an improvement on that of our copending application Serial No. 590,458, filed February 2, 1932, and in other respects presents subject matter generic and common to that of said earlier application and also that of our copending application Serial No. 696,360, filed November 2, 1933.

In the drawings, illustrating one embodiment of the invention, by way of example, Fig. 1 shows the apparatus as a whole, seen from the front, as by one viewing the display;

Fig. 2 is a partial longitudinal vertical section through the apparatus of Fig. 1, with parts broken away;

Fig. 3 is an elevation of the lower portion of one side of an apparatus such as that of Figs. 1 and 2, with the concealing front and other parts omitted for clearness in illustration;

Fig. 4 is a horizontal section, looking downwardly, substantially on the line 4—4 of Fig. 3;

Figs. 5 and 6 are respectively a side elevation and a partial front elevation of one multiple unit or section for an apparatus such as that of the preceding figures;

Fig. 7 illustrates a single element or individual storage unit of one of the multiple sections;

Fig. 8 is a view partly in horizontal section and partly in elevation, showing the drive end of a single unit such as that of Fig. 7, upon an enlarged scale;

Figs. 9 and 10 are respectively an end elevation and a partial longitudinal section through one storage unit or drum;

Figs. 11 to 14 illustrate details of means for detachably connecting a rug or the like to one of the drums, Figs. 11 and 12 being respectively a partial front elevation and a cross-section through one portion of said means, and Figs. 13 and 14 being corresponding views of other parts thereof;

Figure 25:
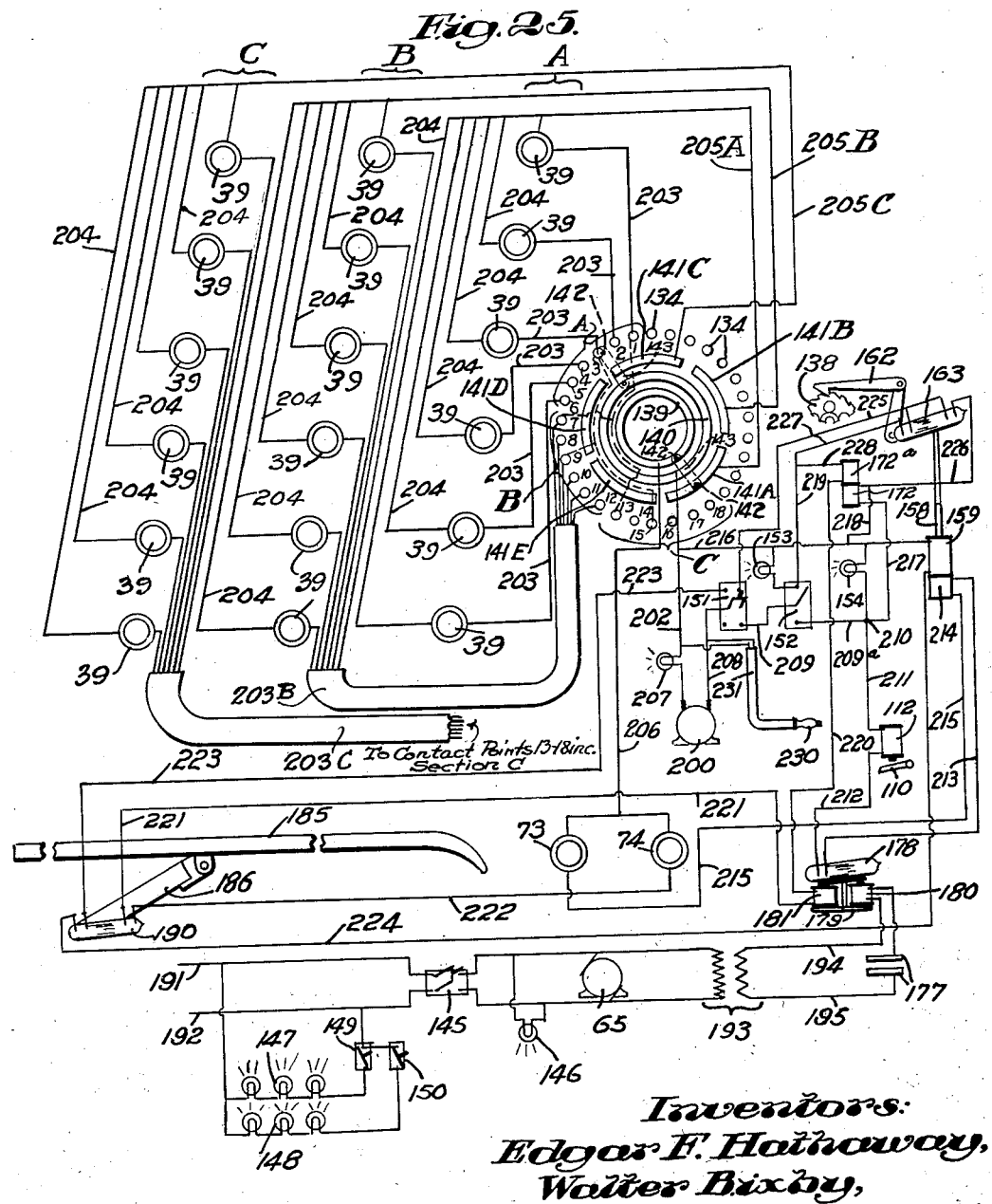

Figs. 15 and 16 respectively are a side elevation and cross-section of a speed-changing drive associated with the rug extending and returning mechanism;

Figs. 17 and 18 are front and rear elevations respectively of the control board or panel;

Fig. 19 is a plan of the parts illustrated in Fig. 18;

Fig. 20 is a rear elevation of the contact element of the selective control seen at the upper portion of Figs. 17 and 18;

Fig. 21 is a vertical sectional view, upon a larger scale, of a portion of the control mechanism of Figs. 17 to 20;

Figs. 22 and 23 are a partial front view and a vertical section of one of the switch panels seen in Figs. 17 and 18;

Fig. 24 illustrates a switch mechanism operable by a rug in the course of its movement to and from display position; and Fig. 25 is a wiring diagram.

In the embodiment of the invention selected for the purpose of illustration, referring first to Figs. 1 and 2, the storage and operating mechanism is appropriately concealed or housed, as behind a decorative front in the nature of a proscenium or arch 1. The various rugs or the like are stored in back of the arch, in readiness for individual display. The term "rug" as herein used will be understood as inclusive of any of the bulky flexible sheet articles to which our apparatus and methods are adapted. In Fig. 1 the leading or free portion of the foremost rug R is seen through the arch, at R, for which it in effect provides a curtain.

At the base and in front of the arch is a floor, display surface, or platform 2 upon which the rugs are to be extended flatwise for the purposes of display and examination. This platform may be a portion of the flooring of the room in or adjacent which the apparatus is located or, as illustrated, may be a relatively low stage or platform, elevated or otherwise, installed with the apparatus, desirably in sections, for ease in installation or removal.

Behind the decorative arch 1 is the frame or support for the storage and operating mechanism. Referring to Figs. 3 and 4, the main frame herein includes the upright corner posts or angle bars 3, 3, and other similar uprights 4, 4, set on suitable bases 5. At the frame sides the corner posts are connected as by the lower and upper longitudinal side beams 6, see also Fig. 2. Spaced inwardly from the outer side beams 6 are other longitudinal members 7 extending between the uprights 4, suitable cross supports 8, 8, seen in section in Fig. 2, connecting said frame members 6.

In accordance with our invention the apparatus may accommodate widely varying numbers of rugs. Desirably it is constructed and arranged so that units or multiple sections hereof may be added or removed to suit the particular conditions of use. The main framing may be of any desired depth from front to rear, and may be added to or shortened as occasion may require. That shown in Fig. 3 is of an intermediate length, accommodating three multiple sections, each itself a structural unit, and each containing a plurality of the individual storage elements or units. In Fig. 2, two of these multiple units are seen in end view. Generally the main framing as above described will be of the maximum depth likely to be required in any given installation, for example, sufficient to support five or more multiple sections, any of which may be omitted, added or removed to suit particular needs.

In Figs. 7-10, we illustrate one of the individual storage units, of which there is a series in each multiple section. Each such unit comprises a rotary element, reel or beam, indicated as a whole by the numeral 10, of a sturdy but light construction. Each beam 10 is built up on a central tube or core 11. At the ends of the core, see Fig. 8, a plug 12 is inserted and secured, a stud shaft 13 being set centrally into each plug.

At suitable points along the core 11 are pairs of oppositely disposed plates 14, each having a central collar 15 adapted to be passed over and secured to the core. Each plate, see Fig. 9, is formed with a circumferential series of sockets 16 receiving wooden or other bars 17. As best seen in Figs. 6 and 7, the series of bars extending between and supported by two opposed plates 14 provides the rug-receiving portion of each open or hollow reel or beam 10 thus formed.

In each of the plates 14, Fig. 9, is a bevel-sided notch 18 to accommodate the rug carrier bar 19; see also Fig. 7. This carrier bar 19 of each beam 10 is attached to its beam by a plurality of straps 20, between pairs of adjacent plates 14. The inner end of each strap is anchored to the core 11. Each rug is removably attached to the carrier 19 of its particular beam 10, as by means of the detachable fastening means 21, Fig. 7, the latter illustrated in detail in Figs. 11 to 14, to be described. The straps 20 may be of any desired length, preferably sufficient to allow for fully extending to display position the shortest rug likely to be handled. When any beam 10 is driven in the "up," rug-storing or returning direction, its several straps 20 are first wound on the beam core. The rug carrier bar 19 at its outer end then comes opposite and seats in the aligned notches 18 of the several plates 14, so that it comes flush with the bars 17 of the beams. Further turning of the beam in the same direction then acts to roll up the rug itself.

The individual storage elements or beams 10 as described are of relatively light weight, inexpensive in manufacture and may be made up in various lengths as desired, comprising one, two or more longitudinal sections, each of which in turn may be readily varied in length.

At one end of each rug beam, herein the left, see Fig. 8, is a drive gear 22, rigidly attached in any suitable manner, as by welding as indicated at 23. The stud shafts 13 at the opposite ends of the beams are rotatably received in bearings 24 in brackets 25 attached to the inclined uprights 26 of the particular multiple unit section. Collars 27 fixed on the outer ends of the shafts 13 position them longitudinally.

Referring now to Figs. 5 and 6, one of the multiple unit sections is there illustrated separately. In this instance, it is made up of, or adapted to accommodate, six of the above described individual rug storage elements or beams 10. Each such multiple section has its own framing, including, at each end, a base piece 30, a front upright 31 and the inclined upright or side member 26 previously mentioned. The members 26, 30 and 31 at the opposite sides of the section as a whole are cross-connected by the lower and upper cross-pieces 32 and 33, Fig. 6. The bearing brackets 25 for the shafts of the several beams 10 are distributed along the inclined side uprights 26, as seen in Figs. 5 and 6. Obviously these multiple sections may be formed of any desired height, to accommodate any greater or less number of individual units than as herein illustrated.

Referring still to Figs. 5 and 6, and also Fig. 8, each unit or beam of the multiple sections is adapted to be driven, herein by pinions 34, fast on the inner ends of a series of short shafts 35, one for each beam, journaled in bearings 36 mounted along the front of the inclined uprights 26. Outside said uprights 26 each of the short shafts 35 has loose on it a sprocket 37. One element 38 of a clutch is attached to the outer face of each sprocket. The other main portion of the clutch, herein magnetic, indicated as a whole by the numeral 39, is attached to the shaft outside and adjacent said sprocket-carried part 38.

The entire series of loosely mounted sprockets 37 of each multiple section is driven by a chain 40 passing around each of the sprockets and extending down to the main drive mechanism, Fig. 3, to be described. A series of idler sprockets 41 is journaled along the outer face of the inclined uprights 26, one idler between each two adjoining drums, to insure the proper tension and functioning of the drive chain 40.

One of the clutches 39 and associated parts is illustrated in further detail and upon a larger scale in Fig. 8. Referring to said figure, the main portion of the clutch 39 comprises a drum, the outer surface of which is formed to receive a brake band 42. This drum has a laterally projecting hub 43 keyed to the outer end of the shaft 35. In an annular recess 44 in the drum is the magnetic winding 45 electrically connected with a pair of ring contacts 46 on a collar 47 surrounding said hub 43 and affixed to the clutch 39 as by means of the bolt 48. A pair of spring-pressed brushes 49 mounted in a box 50 on the upright metal conduit 51 bear respectively on the ring contacts 46.

Cooperating with the described magnetic clutch member 39 is an annular plate 52 secured flatwise against the adjacent clutch member 38. The latter is angularly fixed with respect to its sprocket 37, but is axially movable for clutching and unclutching action on studs 53 on the adjacent face of the sprocket received in said clutch member 38.

Thus none of the beams of any particular multiple section is operated until the circuit for the clutch of the desired beam is closed. On closing of the circuit for any given clutch, by the selective or automatic pattern means to be described, the two clutch portions 38 and 39 and consequently the sprocket 37 are operatively engaged, thus drivingly connecting the sprocket to its shaft 35. By means of the pinion 34 at the inner end of the sprocket shaft, meshing with the gear 22 on the corresponding beam, the latter is rotated to roll or unroll its rug.

The brake bands 42, Fig. 8, prevent the respective beams from over-running, and bring them quickly to rest. As seen in Fig. 3, the brake band for each beam clutch unit has one end secured to a stud 54 on a bracket 55 projecting from the adjacent upright. The band extends over the clutch element 39 and down past a second stud 56. A weight 57 at the depending end of the band holds it yieldingly in operative position.

As illustrated in Fig. 8, a holding pawl 58 may be provided, for each beam, adapted normally to hold it against unwinding. This pawl is pivoted as at 59 on an ear on the bracket 36, being normally held in engagement with the pinion 34 as by the spring 60. It is integral with or attached to a yoke-shaped arm 61 straddling the clutch mechanism and terminating in an operating portion 62 by which the pawl is disengaged on energizing of its clutch.

As described, the several beams or individual storage units of each multiple section are drivingly connected with a common drive chain 40 of that section. When the apparatus as a whole is in operation, any selected beam in any particular section may be actuated, by energizing its clutch, the other beams remaining at rest.

The drive chains 40 of each multiple section are arranged to be driven in one or the opposite direction, to display or return a selected rug, by drive mechanism such as illustrated, for example, in Figs. 3 and 4. Referring to said figures, power is derived from an electric motor 65 herein set on the framing. The motor is connected by a belt 66 with a pulley 67 on a shaft 68 carrying a drive pinion 69. The parts just mentioned may conveniently be mounted on a stand 70 on the machine frame.

The pinion 69 is positioned between and meshes with each of the two gears 71, 72 which are loose on their respective shafts. Each gear has associated with its electro-magnetic clutch mechanism, which may be similar to that of Fig. 8, as described in connection with the individual beams. The magnetic or solenoid portions 73, 74 of the respective clutches are connected to or integral with said gears, the cooperating clutch portions being formed by or attached to the sprockets 75, 76, Fig. 4. Energizing of one or the other of the clutches 73, 74 determines the direction in which any selected rug beam is turned, to display or to return its rug.

A main drive chain 77 extends over one sprocket and under the other, herein passing over the left-hand sprocket 75 and beneath the right sprocket 76. The drive chain 40 for the foremost multiple section is operated by a sprocket 78, Fig. 4, on the same shaft with said right hand main sprocket 76. The lower run of the drive chain 77 extends rearwardly beneath and in driving engagement with a sprocket 79 at the second multiple section of rug storage units, thence up over an idler sprocket 80, and about a sprocket 81 at the third multiple section, whence it reurns forwardly to said right hand main sprocket 76.

The drive chains 40 of each of the other multiple sections have corresponding sprockets 82 and 83 fixed on the short shafts carrying said sprockets 79 and 81 respectively. The shafting for each of the sprockets referred to, including those for the multiple sections and the main drive sprockets 75, 76 is journaled on the framing, as on the longitudinal member 6.

When the motor 65 is running, the pinion 69 is driven, herein counter-clockwise, as indicated by the arrow, and drives the gears 71, 72, each clockwise, in the direction of the arrows on them. But since the main drive chain 77 extends over the sprocket 75 of the gear-clutch 71—73, but beneath the corresponding sprocket 76 of the gear-clutch 72—74, it will be driven in one or the opposite direction depending on which clutch is energized. In the illustrated example, energizing of the clutch 73 for the gear and sprocket 71, 75 causes the upper run of the main drive chain 77 to travel toward the left in Figs. 3 and 4, to bring down a rug, while energizing of the clutch 74 for the gear and sprocket 72, 76 moves the upper run of the chain oppositely, toward the right in said figures, to return or elevate the rug of any particular beam then in operation. It will be understood that if additional multiple sections are added, they will be similarly driven, a sprocket similar to the member 79 or 81 being provided for each additional section and the drive chain 77 being correspondingly extended.

As in our previous application above identified, it is an important purpose of our invention to provide for the display of rugs in their natural or use position, that is, substantially horizontal and flat, and in such manner that they may be freely examined, walked on, or lifted and reversed in whole or in part to expose their under sides. Suitable means is accordingly provided for receiving any selected rug, and for moving it out into flat display position, as upon the flooring or platform 2. In the present embodiment of the invention, as in that of our preceding application, this is accomplished by means of one or more endless conveyors or belts disposed to receive and extend each rug for display on the platform.

In Fig. 2 one of these conveyors or belts 90 is seen at the lower portion of the figure. Its upper run extends along and upon the flooring of the platform 2 and passes over a pulley 91 near the front of the latter. From this front pulley the lower run of the belt extends rearwardly beneath the platform flooring, and herein is conducted back to the rear portion of the apparatus, see Fig. 3, where it extends about a pulley 92 on a shaft 93 journaled on the adjacent rear portion of the framing. Idler pulleys may be provided at one or more intermediate points. Any preferred number of these horizontal conveyors or belts may be employed, depending somewhat on the width of the apparatus and of the articles or rugs to be displayed. In the illustrated example, as seen in Fig. 1, four such belts are shown.

Suitable provision is made for moving the belts in one or the opposite direction to extend or return a rug. They are desirably placed in motion in the rug-extending direction at or about the time when any selected rug begins to move from its stored position, to be in readiness to receive and carry the rug forward as it comes down. The belt drive is accomplished in this instance by a sprocket 94 on the shaft 93 of the rear belt pulley 92. This sprocket is drivingly connected by a chain 95 with an upper sprocket, not shown, on a shaft 96 journaled on the adjacent rear upright 4. The shaft 96 also carries a gear 97 meshing with a second gear 98 on a shaft 99 also journaled on said rear upright 4 and on the adjacent corner post 3. This shaft 99 is driven, herein through a change-speed gearing, from a sprocket 100, Figs. 3 and 4, operated by a chain 101, which in turn is driven by a sprocket 102 on the shaft of the sprockets 81, 83 of the nearest multiple section, the rearmost or third section as shown in Fig. 3.

We have found it desirable in some instances, particularly with comparatively heavy or like articles, to operate the belts in the advancing or display direction at a somewhat greater speed than in the return or storage direction, since the weight of the rugs themselves tends to accelerate the speed of their beams in their display or "down" movement, and to slow them down during rug return. In other words, it is found practicable to operate at a higher speed in displaying a rug than in returning it. In such instances, or in any case, if preferred, we may employ a change speed mechanism in connection with the belt drive, and we have here illustrated such mechanism intermediate the rear sprocket 100 of the intermediate chain 101 and the upper sprocket of the lead-down chain 95. Any suitable mechanism may be employed for the purpose, that herein selected for illustration being of the planetary type. It is seen in detail on a larger scale in Figs. 15 and 16.

Referring to said figures, the rear sprocket 100 of said chain 101 has attached to its inner face, as by means of a series of bolts 103, a large gear 104 and a concentric collar 105. These three rigidly connected members, the sprocket 100, disk 104 and collar 105, are loose on the shaft 99. Keyed on said shaft is a spider 106 carrying a circumferential series of pinions 107 disposed around and in meshing engagement with said gear 104, and also with a surrounding internal or ring gear 108. This internal gear or ring 108 is otherwise unconnected either with the sprocket or the spider. It has formed on its outer periphery a ratchet 109. A pawl 110, Fig. 15, is pivoted as at 111 upon an adjacent portion of the machine frame, in position to engage the ratchet 109, to hold the ring gear 108 against turning in one direction when said pawl is engaged but permitting it to turn in said direction when the pawl is disengaged, by means of a solenoid 112.

A one-way clutch or free wheel arrangement is also provided between the spider 106 and the sprocket 100 and its attached parts 104, 105. Said clutch device is herein illustrated as of the roller clutch type comprising rollers 113 respectively seated in flat-faced wedge-like recesses 114 in the collar 105 secured to the drive sprocket 100. Reference is now had to Fig. 15 which is a view looking in the opposite direction from that of Fig. 3, in other words, looking in the direction from top to bottom in Fig. 4. When the conveyors or belts 90 are to be driven in the rug-extending or down direction, the drive chain 101 is driven in the direction indicated by the arrow and the word "down" at the top of Fig. 15 and also on Fig. 3, at which time the shaft 99 is to be driven, by said chain 101 and sprocket 100, in a clockwise direction, as viewed in Fig. 15 and as indicated thereon by the arrow and the word "down" at the central part of said Fig. 15. The sprocket 100 and its attached parts 104, 105, being driven by the chain 101 in a clockwise direction, Fig. 15, cause the rollers 113 to wedge in their recesses, hence clutching the sprocket 100 to the spider 106 and consequently to the shaft 99. All of the parts accordingly revolve as a unit, at a relatively high or one-to-one speed ratio. At such times the solenoid 112 is energized to elevate and hold the pawl 110 out of engagement with the ratchet 109. The shaft 99 accordingly is driven clockwise as viewed in Fig. 15, and counter-clockwise as viewed in Fig. 3. The gear 98 on said shaft 99 also is then driven counter-clockwise as viewed in Fig. 3, driving its inter-meshing gear 97 on shaft 96 in a clockwise direction and hence driving the lead-down chain 95 in the direction indicated by the arrow and the word "down" on Fig. 3. The upper runs of the conveyors or belts 90 are accordingly moved in the rug-extending or "down" direction, also as indicated by the arrow and the word "down" at the bottom left portion of Fig. 3.

When the belts or conveyors 90 are to be reversely driven, for returning the rugs, and the shaft 99 is to be rotated in the direction oppositely to that above described, that is, is to be driven counter-clockwise as indicated by the arrow and the word "up" at the central portion of Fig. 15, the solenoid 112 is at such time de-energized, letting in the pawl 110, to engage and hold the ratchet 109 and ring gear 108 against turning in a clockwise direction, as viewed in said Fig. 15. The driving chain 101 is now moving in the direction indicated by the arrow and the word "up" at the top of Fig. 15, oppositely to the drive direction as previously described. The drive sprocket 100 and its attached parts accordingly are driven counter-clockwise, Fig. 15, causing the rollers 113 of the clutch to be released, and allowing the spider 106 carrying the pinions 107 to turn independently of the sprocket. Since said pinions 107 are in mesh with the internal ring gear 108 and the latter is prevented from turning clockwise, Fig. 15, by the now engaged pawl 110, said pinions rotate on their own axes, clockwise, as indicated by the dotted arrow on the pinion 107 at the top in Fig. 15, and hence said pinions are also forced to revolve bodily, thereby revolving the spider 106 counter-clockwise and driving the shaft 99 in said counter-clockwise direction, the same as that of the drive sprocket, but at a reduced or slow speed as compared with that of the sprocket. Hence, the conveyors or belts 90 are driven in the rug-returning direction at the desired reduced speed.

Referring again to the unit beams 18, the rugs are attached, preferably removably, herein to their carrier or attaching bars 19, in any suitable manner as, for example, by means of detachable fasteners such as illustrated in our co-pending application above mentioned. We herein disclose an improved form of such fastening means, illustrated in detail in Figs. 11 to 14.

Referring to said figures, one of the straps 20, see also Fig. 7, is there shown. As seen in Figs. 11 and 12, the free or depending end of the strap is looped about the carrier bar 19 and held between clamp pieces 115 at the opposite faces of the bar. The rug fasteners themselves are distributed along the bars at suitable intervals, three being shown in Fig. 7. As best seen in Figs. 13 and 14, each fastener includes one or more pins 117 projecting from the bar, preferably at a slight upward angle. The rug R is impaled on the pins, and there locked by a locking member 118 of general yoke-shape, adapted to straddle the bar and rug, and pivotally attached to the bar as at 119. At the face of the bar from which the pins project this yoke-like lock member is formed with an arcuate slot 120 concentric with the pivot 119 and disposed to receive and enclose the outer end of a pin 117 when the lock is swung down from its released position at the right in Fig. 13 to its holding position as shown at the left in Fig. 13 and in Fig. 14. The portion of the locking yoke 118 at the opposite side of the bar is formed with a spring detent 121 adapted to snap under the carrier 19, to retain the yoke in locking position. A finger piece 122 may be provided for convenience in swinging the locking member to open position.

The carrier bars 19 are desirably comparatively light metal elements, or if of wood or non-conducting material, are provided with a longitudinal contact strip for a purpose to be described.

pivoted at the right end of the fixed bar 156 is disposed oppositely to the positioning dog 160, being free to ride over the ratchet teeth, but dropping in behind the adjacent tooth after each turning movement, thus preventing reverse movement.

Also on the bell-crank 161 is a mercoid switch 163 which is shifted from one position to another by the same operation of the solenoid 159 above mentioned, to open one circuit and close another as will be described in connection with the wiring diagram, Fig. 25. By means of an adjustable weight 164, Fig. 18, on a rod 165 mounted on the hub of the bell-crank 161, the operation of the associated parts may be accurately adjusted.

An additional positive locking device desirably is also provided for holding the brush-contact carrying disc 137 in the selected position during any cycle of operation of the apparatus. To this end the disc 137 is formed with the peripheral notches 137a, corresponding in number and location to the teeth of the ratchet wheel 138, and to the number of the selector index 132. As best seen in Fig. 21, and also in Fig. 18, a dog or stop 166 is mounted for movement into or out of holding engagement with the particular notch 137a then opposite it. This stop 166 is carried by the upper horizontal arm 167 of a bell crank pivoted at 168 on a bracket 169 suitably supported at the rear of the control board 130, as upon the adjacent face of the switch box 170. The depending arm 171 of the bell crank is adapted to be moved to the left in Fig. 21, to elevate the stop 166 into holding position, by a lock coil or solenoid 172 included in the control circuits to be described.

In this connection we have also illustrated in Fig. 21 a safety feature whereby, under manual or selective operation it is made impossible to shift the selector mechanism, once a display cycle has been started, until the control switch or element 152 has been moved to "up" position for returning any rug which may have been started toward display. For this purpose the switch lever 152 has attached to it a rearwardly projecting finger 173 which engages a vertically movable tappet 174, the upper end of which lies beneath a forward extension of the upper arm 167 of the bell-crank carrying the dog 166. When the switch lever 152 is moved down the tappet 174 is elevated into contact with said arm 167, thereby holding the dog in locking engagement with the then opposite notch 137a. Hence, the notched disk 137 and associated parts cannot be moved until the switch lever 152 is returned to the position illustrated in Fig. 21, with the resultant restoring of the particular rug which has been displayed or started toward display. Accordingly it is impossible for the operator unthinkingly to attempt to start a second display cycle until that preceding has been completed or revoked. The described mechanism and associated circuits also make it compulsory that the manual or selective control switch 152 shall be "up," in rug restoring and normally inactive position, before or when the apparatus is placed in continuous, full-automatic operation.

As described, the conditioning switch 151 of Fig. 17 determines as between manual selective and continuous full-automatic operation. Provision desirably is made for locking this switch in the manual selective position, during that operation. This avoids any possibility of unintentional or careless throwing of this switch 151 into the position for continuous operation while a manually selected cycle is in progress. As illustrated in detail in Figs. 22 and 23, this supplemental safety lock includes a finger 175 at the rear of the switch panel 151a and pivotally supported thereon. A knob 176, projecting at the front of the switch panel, is fixed to the finger 175 or its pivot, for swinging the latter from substantially horizontal and locking position, as shown in Figs. 22 and 23, to elevated or released position. As shown in said figures the finger 175 lies behind a projection 151b on the switch lever 151 thereby preventing movement of the latter from its "down" or selective operation position there illustrated to "up" or continuous operation position.

Each display cycle includes the movement of any particular rug from its stored position, in which it is rolled upon its beam at least sufficiently to hold its depending or leading portion above the level of the conveyor belts, out to flatwise display position upon the platform, and also includes the subsequent reverse storage, return or "up" movement. These two operating portions of each display cycle are herein referred to respectively as the display or "down" movement and the return or "up" movement. In the illustrated embodiment of our invention the display movement is halted when the rug is fully extended. This halting may be momentary, or for a predetermined time. Herein, under manual selective control, each rug comes to rest and remains in display position until the operator initiates the return movement of that cycle. Under continuous full automatic operation each rug halts in display position and thereafter automatically starts its return movement.

For halting the display movement, under either method of operation, arrangement is made for the automatic interruption of the display circuit or circuits as a rug reaches its desired or full-extended display position. As previously noted, this may conveniently be effected by the carrier bar 19 of each rug, if metallic, or by a strip contact element thereon, in some instances the flexible depending elements or chains 123 being provided in electrical communication with the carrier bar or said contact strip; see Fig. 13. As the rug reaches its desired display position, its carrier bar or said chain thereon makes contact across a pair of plates 177 suitably located in the upper surface of the display platform, or at other appropriate point. One of said plate contacts is seen at the lower central portion of Fig. 2. They are illustrated diagrammatically at the lower right corner of Fig. 25.

Associated with these plates 177 is a second mercoid switch 178, Figs. 18 and 25, disposed at any suitable point and herein upon the back of the control board 130. This mercoid switch 178 is pivotally supported on a stand 179 so that it may be rocked from one position to another, and may be held in the respective positions as by the magnets 180 and 181, Figs. 18 and 25. As shown in Fig. 18, the circuit controlled by the mercoid switch 178, to be described, is open, while in Fig. 25 it is closed.

Provision is also made for automatically bringing each rug to rest at the end of its return movement, under either selective or full-automatic operation. This return stopping is herein controlled or conditioned by an additional switch mechanism which may conveniently be such as illustrated in detail in Fig. 24.

Referring to said figure, a bar 185 is positioned beneath and in the path of all of the rugs, in such manner that it is engaged and depressed by any rug as its leading portion moves from stored position and "turns the corner" onto the rug-extending or conveyor means. Said bar 185 is of sufficient length to underlie the rugs of all multiple sections employed. It is pivotally carried at the upper ends of arms 186, the lower ends of which are pivotally mounted as at 187 upon any convenient portion of the framing. The bar 185 is normally yieldingly held up in the position shown in Fig. 24 as by the spring 188.

Associated with the bar 185, as upon one of the arms 186 is a further mercoid switch 190 having two positions, corresponding respectively to the elevated or depressed position of the bar 185. Two circuits are controlled by this mercoid switch 190, one being open and the other closed, and vice versa, in the two switch positions. The depressing of the bar 185 during the display movement of any rug serves to condition the mercoid switch 190 for subsequently halting the return movement of that rug, as will be fully understood in connection with the wiring diagram of Fig. 25.

Referring now to Fig. 25, in which various of the parts are illustrated diagrammatically, together with their electrical connections, the power mains appear at 191, 192, at the bottom of the figure. The main control switch or "motor switch" 145 is adapted to open or close these power mains. The motor 65 is connected across the mains as shown, as is also the lower pilot 146 which thus serves to indicate that the motor is in operation and the apparatus as a whole in use condition.

The two banks of lights 147 and 148, comprising respectively "daylight" and "lamplight" bulbs, are indicated at the lower left corner of Fig. 25, being connected in series across between the mains 191, 192. Either series may be illuminated, selectively, by throwing in the corresponding switch 149 or 150.

The power mains 191, 192 are extended to a transformer 193 located at any convenient point, as upon the machine framing. By this transformer the voltage is stepped down from say 110 volts to 16 volts. The low voltage side of the transformer is connected through a lead 194 with the coil or magnet 180 associated with the mercoid switch 178 and thence to one of the plates 177. From the other plate 177 a lead 195 returns to the low voltage side of the transformer, making a circuit, including the plates 177 and the magnet 180, which is adapted to be closed by a rug carrier-bar or other associated part as a rug reaches display position. In this manner the magnet 180 is energized to tip the mercoid 178 from its position in Fig. 25 to that shown in Fig. 18.

Where the power supply is alternating current, as here assumed for the purposes of illustration, a suitable source of direct current is provided, for operation of the clutch and other control circuits. Herein for the purpose we have shown a D. C. generator 200, Figs. 3 and 25, driven from the motor 65 as by the belt 201, and mounted in any convenient manner, as upon the longitudinal beam 5 and associated elements of the framing. Current for each of the circuits now to be described is herein supplied by this generator.

Referring again to Fig. 25, the selector mechanism is seen at the upper central portion of the figure. The point contacts 134 corresponding to the individual rugs of the three multiple sections herein shown are indicated by the numbers 1 to 18 inclusive, numbers 1 to 6 controlling the corresponding rug of the front section A, as indicated by the bracket and letter A, numbers 7 to 12 being for the next section from the front, B, and numbers 13 to 18 for the third section, C. The individual beam-controlling clutches for the several sections are seen diagrammatically at 39, 39, etc., six to each multiple section A, B, C, etc. As but three multiple sections are illustrated, there are blank, unnumbered contacts in the diagram, for two additional sections, which would include rugs 19 to 24 and 25 to 30 respectively.

One side of the generator 200 is connected by a line 202 with the intermediate contact ring 140 of the selector mechanism. From said ring the circuit crosses through the outer pair of brush contacts 142 to any selected individual point contact 134. In Fig. 25, by way of example, said brush contacts are shown on the point numbered 3, corresponding to the third drum-clutch from the top in section A. Said clutch, and each of the clutches of said section A is connected to its corresponding individual point contact 134 by one of the leads 203. Similarly, the clutches of section B are respectively connected to their individual point contacts numbers 7 to 12 by one of the leads 203B, similar individual leads 203C being provided between the clutches of section C and their respective point contacts numbers 13 to 18.

From any particular clutch of each section, the circuit is continued through one of the clutch lines 204, one for each individual clutch, to the common return lead 205A, 205B or 205C, running respectively to the contact sector 141A, 141B or 141C. The proper sector for the multiple section in which the selected unit is contained, for example, section A as shown in the diagram, is cross-connected through the inner pair of brush contacts 142 with the inner contact ring 139. From the latter a line 206 extends to the display or "down" clutch and to the return or "up" clutch 73 or 74 either of which is adapted to be connected in series with the selected unit or rug-beam clutch 39, seen at the lower central portion of Fig. 25, just above the motor 65.

One or more bulbs 207 are desirably connected serially into the generator line 202, which insures that any possible short circuit will not blow a fuse but simply light said bulb or bulbs, at the same time indicating such short circuit.

Assuming now that the apparatus is to be operated selectively, under manual control, switch 151 for determining the type of operation, shown in central or neutral position in Fig. 25, is thrown down. The selective cycle controlling switch 152 is then likewise moved from its central or inoperative position of Figs. 17 and 25 into "down" or display position. A circuit is thereby completed, from the other side of the generator 200, through the connection 208, across the switch 151, through a connection 209 to the switch 152, both switches being then in "down" position. Thence a connection 209ª extends to the binding post 210, through a lead 211 to the solenoid 112, lifting the pawl 110 for high speed on the conveyor belt, as previously described. This circuit continues through a wire 212 through one side of the mercoid switch 178, which is then in the position shown in Fig. 25, and thence through the connection 213 to the hold-down coil 214. This hold-down coil serves no function during manual-selective operation, but acts to hold the selector moving device down during each "down" portion of the automatic operation. Thence the pivoted at the right end of the fixed bar 156 is disposed oppositely to the positioning dog 160, being free to ride over the ratchet teeth, but dropping in behind the adjacent tooth after each turning movement, thus preventing reverse movement.

Also on the bell-crank 161 is a mercoid switch 163 which is shifted from one position to another by the same operation of the solenoid 159 above mentioned, to open one circuit and close another as will be described in connection with the wiring diagram, Fig. 25. By means of an adjustable weight 164, Fig. 18, on a rod 165 mounted on the hub of the bell-crank 161, the operation of the associated parts may be accurately adjusted.

An additional positive locking device desirably is also provided for holding the brush-contact carrying disc 137 in the selected position during any cycle of operation of the apparatus. To this end the disc 137 is formed with the peripheral notches 137ª, corresponding in number and location to the teeth of the ratchet wheel 138, and to the number of the selector index 132. As best seen in Fig. 21, and also in Fig. 18, a dog or stop 166 is mounted for movement into or out of holding engagement with the particular notch 137ª then opposite it. This stop 166 is carried by the upper horizontal arm 167 of a bell crank pivoted at 168 on a bracket 169 suitably supported at the rear of the control board 130, as upon the adjacent face of the switch box 170. The depending arm 171 of the bell crank is adapted to be moved to the left in Fig. 21, to elevate the stop 166 into holding position, by a lock coil or solenoid 172 included in the control circuits to be described.

In this connection we have also illustrated in Fig. 21 a safety feature whereby, under manual or selective operation it is made impossible to shift the selector mechanism, once a display cycle has been started, until the control switch or element 152 has been moved to "up" position for returning any rug which may have been started toward display. For this purpose the switch lever 152 has attached to it a rearwardly projecting finger 173 which engages a vertically movable tappet 174, the upper end of which lies beneath a forward extension of the upper arm 167 of the bell-crank carrying the dog 166. When the switch lever 152 is moved down the tappet 174 is elevated into contact with said arm 167, thereby holding the dog in locking engagement with the then opposite notch 137ª. Hence, the notched disk 137 and associated parts cannot be moved until the switch lever 152 is returned to the position illustrated in Fig. 21, with the resultant restoring of the particular rug which has been displayed or started toward display. Accordingly it is impossible for the operator unthinkingly to attempt to start a second display cycle until that preceding has been completed or revoked. The described mechanism and associated circuits also make it compulsory that the manual or selective control switch 152 shall be "up," in rug restoring and normally inactive position, before or when the apparatus is placed in continuous, full-automatic operation.

As described, the conditioning switch 151 of Fig. 17 determines as between manual selective and continuous full-automatic operation. Provision desirably is made for locking this switch in the manual selective position, during that operation. This avoids any possibility of unintentional or careless throwing of this switch 151 into the position for continuous operation while a manually selected cycle is in progress. As illustrated in detail in Figs. 22 and 23, this supplemental safety lock includes a finger 175 at the rear of the switch panel 151ª and pivotally supported thereon. A knob 176, projecting at the front of the switch panel, is fixed to the finger 175 or its pivot, for swinging the latter from substantially horizontal and locking position, as shown in Figs. 22 and 23, to elevated or released position. As shown in said figures the finger 175 lies behind a projection 151ᵇ on the switch lever 151 thereby preventing movement of the latter from its "down" or selective operation position there illustrated to "up" or continuous operation position.

Each display cycle includes the movement of any particular rug from its stored position, in which it is rolled upon its beam at least sufficiently to hold its depending or leading portion above the level of the conveyor belts, out to flatwise display position upon the platform, and also includes the subsequent reverse storage, return or "up" movement. These two operating portions of each display cycle are herein referred to respectively as the display or "down" movement and the return or "up" movement. In the illustrated embodiment of our invention the display movement is halted when the rug is fully extended. This halting may be momentary, or for a predetermined time. Herein, under manual selective control, each rug comes to rest and remains in display position until the operator initiates the return movement of that cycle. Under continuous full automatic operation each rug halts in display position and thereafter automatically starts its return movement.

For halting the display movement, under either method of operation, arrangement is made for the automatic interruption of the display circuit or circuits as a rug reaches its desired or full-extended display position. As previously noted, this may conveniently be effected by the carrier bar 19 of each rug, if metallic, or by a strip contact element thereon, in some instances the flexible depending elements or chains 123 being provided in electrical communication with the carrier bar or said contact strip; see Fig. 13. As the rug reaches its desired display position, its carrier bar or said chain thereon makes contact across a pair of plates 177 suitably located in the upper surface of the display platform, or at other appropriate point. One of said plate contacts is seen at the lower central portion of Fig. 2. They are illustrated diagrammatically at the lower right corner of Fig. 25.

Associated with these plates 177 is a second mercoid switch 178, Figs. 18 and 25, disposed at any suitable point and herein upon the back of the control board 130. This mercoid switch 178 is pivotally supported on a stand 179 so that it may be rocked from one position to another, and may be held in the respective positions as by the magnets 180 and 181, Figs. 18 and 25. As shown in Fig. 18, the circuit controlled by the mercoid switch 178, to be described, is open, while in Fig. 25 it is closed.

Provision is also made for automatically bringing each rug to rest at the end of its return movement, under either selective or full-automatic operation. This return stopping is herein controlled or conditioned by an additional switch mechanism which may conveniently be such as illustrated in detail in Fig. 24.

Referring to said figure, a bar 185 is positioned beneath and in the path of all of the rugs, in such manner that it is engaged and depressed by any rug as its leading portion moves from stored position and "turns the corner" onto the rug-extending or conveyor means. Said bar 185 is of sufficient length to underlie the rugs of all multiple sections employed. It is pivotally carried at the upper ends of arms 186, the lower ends of which are pivotally mounted as at 187 upon any convenient portion of the framing. The bar 185 is normally yieldingly held up in the position shown in Fig. 24 as by the spring 188.

Associated with the bar 185, as upon one of the arms 186 is a further mercoid switch 190 having two positions, corresponding respectively to the elevated or depressed position of the bar 185. Two circuits are controlled by this mercoid switch 190, one being open and the other closed, and vice versa, in the two switch positions. The depressing of the bar 185 during the display movement of any rug serves to condition the mercoid switch 190 for subsequently halting the return movement of that rug, as will be fully understood in connection with the wiring diagram of Fig. 25.

Referring now to Fig. 25, in which various of the parts are illustrated diagrammatically, together with their electrical connections, the power mains appear at 191, 192, at the bottom of the figure. The main control switch or "motor switch" 145 is adapted to open or close these power mains. The motor 65 is connected across the mains as shown, as is also the lower pilot 146 which thus serves to indicate that the motor is in operation and the apparatus as a whole in use condition.

The two banks of lights 147 and 148, comprising respectively "daylight" and "lamplight" bulbs, are indicated at the lower left corner of Fig. 25, being connected in series across between the mains 191, 192. Either series may be illuminated, selectively, by throwing in the corresponding switch 149 or 150.

The power mains 191, 192 are extended to a transformer 193 located at any convenient point, as upon the machine framing. By this transformer the voltage is stepped down from say 110 volts to 16 volts. The low voltage side of the transformer is connected through a lead 194 with the coil or magnet 180 associated with the mercoid switch 178 and thence to one of the plates 177. From the other plate 177 a lead 195 returns to the low voltage side of the transformer, making a circuit, including the plates 177 and the magnet 180, which is adapted to be closed by a rug carrier-bar or other associated part as a rug reaches display position. In this manner the magnet 180 is energized to tip the mercoid 178 from its position in Fig. 25 to that shown in Fig. 18.

Where the power supply is alternating current, as here assumed for the purposes of illustration, a suitable source of direct current is provided, for operation of the clutch and other control circuits. Herein for the purpose we have shown a D. C. generator 200, Figs. 3 and 25, driven from the motor 65 as by the belt 201, and mounted in any convenient manner, as upon the longitudinal beam 5 and associated elements of the framing. Current for each of the circuits now to be described is herein supplied by this generator.

Referring again to Fig. 25, the selector mechanism is seen at the upper central portion of the figure. The point contacts 134 corresponding to the individual rugs of the three multiple sections herein shown are indicated by the numbers 1 to 18 inclusive, numbers 1 to 6 controlling the corresponding rug of the front section A, as indicated by the bracket and letter A, numbers 7 to 12 being for the next section from the front, B, and numbers 13 to 18 for the third section, C. The individual beam-controlling clutches for the several sections are seen diagrammatically at 39, 39, etc., six to each multiple section A, B, C, etc. As but three multiple sections are illustrated, there are blank, unnumbered contacts in the diagram, for two additional sections, which would include rugs 19 to 24 and 25 to 30 respectively.

One side of the generator 200 is connected by a line 202 with the intermediate contact ring 140 of the selector mechanism. From said ring the circuit crosses through the outer pair of brush contacts 142 to any selected individual point contact 134. In Fig. 25, by way of example, said brush contacts are shown on the point numbered 3, corresponding to the third drum-clutch from the top in section A. Said clutch, and each of the clutches of said section A is connected to its corresponding individual point contact 134 by one of the leads 203. Similarly, the clutches of section B are respectively connected to their individual point contacts numbers 7 to 12 by one of the leads 203B, similar individual leads 203C being provided between the clutches of section C and their respective point contacts numbers 13 to 18.

From any particular clutch of each section, the circuit is continued through one of the clutch lines 204, one for each individual clutch, to the common return lead 205A, 205B or 205C, running respectively to the contact sector 141A, 141B or 141C. The proper sector for the multiple section in which the selected unit is contained, for example, section A as shown in the diagram, is cross-connected through the inner pair of brush contacts 142 with the inner contact ring 139. From the latter a line 206 extends to the display or "down" clutch and to the return or "up" clutch 73 or 74 either of which is adapted to be connected in series with the selected unit or rug-beam clutch 39, seen at the lower central portion of Fig. 25, just above the motor 65.

One or more bulbs 207 are desirably connected serially into the generator line 202, which insures that any possible short circuit will not blow a fuse but simply light said bulb or bulbs, at the same time indicating such short circuit.

Assuming now that the apparatus is to be operated selectively, under manual control, switch 151 for determining the type of operation, shown in central or neutral position in Fig. 25, is thrown down. The selective cycle controlling switch 152 is then likewise moved from its central or inoperative position of Figs. 17 and 25 into "down" or display position. A circuit is thereby completed, from the other side of the generator 200, through the connection 208, across the switch 151, through a connection 209 to the switch 152, both switches being then in "down" position. Thence a connection 209ª extends to the binding post 210, through a lead 211 to the solenoid 112, lifting the pawl 110 for high speed on the conveyor belt, as previously described. This circuit continues through a wire 212 through one side of the mercoid switch 178, which is then in the position shown in Fig. 25, and thence through the connection 213 to the hold-down coil 214. This hold-down coil serves no function during manual-selective operation, but acts to hold the selector moving device down during each "down" portion of the automatic operation. Thence the circuit continues through a connection 215 to the display or "down" clutch 73, and through it onto the lead 206 previously mentioned, through the described selector mechanism and selected individual clutch 39 out onto the line 202, through the bulb or bulbs 207 and back to the generator 200.

At the same time, the "down" or display pilot 154 is illuminated, through a shunt circuit extending from the binding post 210, through said pilot onto a lead 216 extending back across to the line 202 at the opposite side of the generator. Another shunt circuit, including the lead 217 from the binding post 210, runs through the lock coil 172, to throw in the selector-locking stop 166 previously described, and back through a wire 218 to said lead 216 and thence to the opposite or left side of the generator.

In this manner, the motor 65 having first been set running by closing the motor switch 145, current flows through the "down" clutch 73 and the selected rug unit clutch 39, its beam is turned to let down the rug, and the conveyor belts are moved, at their higher speed, to receive and extend the rug. As the rug moves down it comes into and depresses the return-stop controlling bar 185 (Fig. 24), thereby tipping the mercoid switch 190, at the lower left in Fig. 25, from the position there shown to the opposite position and so conditioning it for subsequently halting the ensuing return movement.

As the selected rug reaches its extended or display position, to which it is carried out flatwise onto the platform, by the conveyor belts, its carrier bar 19 or otherwise associated contact element crosses the floor plates 177, seen at the lower right corner in Fig. 24. This closes the circuit through the solenoid 180 which thereupon tips the mercoid switch 178 to the opposite position from that shown in Fig. 24 and thereby breaks the "down" or display circuit at the other end of said mercoid switch. The rug accordingly comes to rest in display position.

At any desired time thereafter the return or "up" portion of the cycle may be initiated. The operator has but to throw the cycle-controlling switch 152 to "up" or return position. The return circuit is then established. Starting from the right side of the generator 200, said circuit is through the type-of-operation switch 151 (still down in selective control position), through the up-closed switch 152, through a lead 219 to the selector-holding lock coil 172a, out through a connection 220, into and through the mercoid-tipping coil 181, through a lead 221 to the right side of the mercoid switch 190 (then tipped down and closed, oppositely to the position shown in Fig. 24, by reason of the rug resting on the bar 185), through a wire 222 to the "up" or return clutch 74 to the common line 206, to the selector mechanism and individual clutch 39 and back to the generator by the line 202.

Although the coil 181 is immediately energized, as described, the mercoid switch 178 is not tipped back to the position shown in Fig. 24 until the rug-carrier-bar has moved back off the floor contact plates 177, the coil 181 being for this purpose weaker than the associated coil 180. This re-tipping of said mercoid switch 178 re-conditions the "down" or display circuit for subsequent operation.

It will also be seen that the coil 112 for operating the belt-speed pawl 110 is not energized during the return movement. Hence said pawl is let into engagement with the ratchet of the speed-shifting mechanism, thereby giving the desired relatively slow return motion to the conveyor belts.

When the rug has been carried back to the vertical plane of its particular section, and rewound onto its beam sufficiently to lift its fore or free portion off the belts and off the bar 185 (Fig. 24), the latter moves up to its normal, elevated position of Fig. 24. This tips the mercoid switch 190 back to the position as shown in Fig. 25, thereby breaking the return circuit, at the right end of said switch. The rug accordingly comes to rest in its return, stored position, and all parts and circuit elements are restored to the original condition, in readiness for the next operating cycle, to display the same or any other rug, as selectively determined by the operator, by movement of the selector controlling pointer 135.

During the "up" or return movement the "up" pilot 153 (Fig. 17) is illuminated, through a shunt circuit leading from the "up" point of the switch 152, Fig. 25, through said pilot 153 onto the return wire 216 previously mentioned.

Any parts or connections appearing in Fig. 25, and not referred to in connection with the above described "manual" or selective operation, form portions of the full-automatic or continuous control mechanism and circuits.

For said full-automatic or continuous operation the operation-conditioning switch 151 is thrown to continuous position, upward in Figs. 17 and 25. The safety lock finger 175 of Figs. 22, 23 must first be released. In the illustrated arrangement it is also necessary that the manual selective cycle controlling switch 152 be placed in "up" or return position, it being accordingly impossible to institute full-automatic operation until any preceding selectively-controlled cycle has been completed.

When said automatic-control switch is thrown, into up position, Fig. 25, a circuit is established, starting from the right side of the generator 200, through the left side of said switch, and by a wire 223 through the left end of the mercoid switch 190, which is then tipped down in the position shown in said Fig. 25, and through a line 224 to the selector-operating solenoid 159. Thence it continues partly through the "down" pilot 154 and also to the line 202, and finally through the "down" clutch 73, the particular unit clutch 39, the selector mechanism and other parts back to the left side of the generator, similarly as described for the "down" movement of a manual-selective cycle. This energizing of the selector solenoid 159, with the initial circuit, including a contact at the left end of the mercoid switch 190, operates the selector pawl 162, moving the selector mechanism one step and determining the rug to be selected. The described circuit is interrupted at the left end of the mercoid switch 190 when the rug comes down onto the bar 185, tipping said mercoid switch 190 and closing the contacts at the right end of said switch, thereby conditioning it for the subsequent "up" or return movement.

However, the operation of the selector solenoid 159, in addition to operating the selector pawl 162, simultaneously tips the adjacent mercoid switch 163. This closes a circuit at the right end of said mercoid switch 163, which circuit includes a lead 225 between said right end of the switch and the upper right post of the closed operation-controlling switch 151, and a lead 226 between said right end of the mercoid switch 163 and the lower lock coil 172, Fig. 25. This circuit includes said lock coil 172, the down pilot 154, the speed-controlling solenoid 112 (lifting the pawl 110 for high speed on the rug-extending conveyor belts), the contacts at the left end of the mercoid switch 178 at the lower right of Fig. 25, and the hold-down coil 214, the latter mentioned in connection with the manual-selective operation, but noted as having no effect at such time. The circuit just described, through the hold-down coil 214, also includes the down clutch 73, and the selected individual clutch 39, through the selector mechanism. By means of the hold-down coil 214 the core of the selector solenoid 159 is held down, and the associated mercoid switch 163 remains tipped to the right, opposite to its position shown in Fig. 25, despite the breaking of the original circuit through said selector solenoid 159 at the mercoid switch 190 when the rug comes down onto the bar 185 for conditionally operating the latter.

Accordingly the automatically selected rug is carried out into display position, just as under manual-selective operation, until this movement is halted by completion of a stopping circuit across the floor plates 177. This latter circuit, which includes the stronger magnet 180 of the pair at the lower right in Fig. 25, is effective to tip the associated mercoid switch 178, breaking the previously described "down" circuit at said mercoid 178 and releasing the hold-down coil 214. The rug accordingly comes to rest in display position, momentarily, in this instance.

The release of the hold-down coil 214 allows the core of the selector solenoid 159 to return to "up" position, likewise restores the selector pawl 182 to its previous position, and tips the associated mercoid switch 163 back to its original position as illustrated in Fig. 25. This retipping of the mercoid 163 establishes the return-movement controlling circuit, through the medium of the lead 225 previously mentioned and a further lead 227 extending between the left end of said mercoid 163 and communicating through the wire 219 with the upper post of the "up and down" switch 152, which, as previously stated, must be closed in "up" position during automatic operation.

The return circuit thus established, under automatic operation, and the parts controlled thereby, is the same as previously described in connection with the manual selective operation.

The lock coil 172ª, for locking the selector mechanism, is actuated, through a shunt circuit, including a branch lead 228 and the connection 220 previously mentioned.

When the rug and its carrier bar move back off the contact plates 177, the mercoid switch 178 is tipped back into the position shown in Fig. 25, reconditioning it for the next down movement.

The described automatic-return portion of each cycle, under automatic control, is also automatically interrupted, as under manual-selective operation, when the rug lifts off of the bar 185, thereby breaking the circuit at the right end of the mercoid 190, and allowing the latter to tip back into its position as in Fig. 25, thereby conditioning it for completion of the next subsequent selector-solenoid operation, and initiation of the following "down" or display movement. Hence the automatic operation continues through uninterruptedly succeeding cycles of down and return movements, so long as the apparatus remains in operation, one rug after another being selected, displayed and returned.

Desirably we provide means whereby the operator may temporarily halt a rug in any position, during either selective or full-automatic procedure, and desirably in such manner that the particular cycle or sequence of operations is merely temporarily interrupted, but not otherwise disturbed, and so that it may be resumed, at the point where it is halted, at the will of the operator. For this purpose we have illustrated, in Fig. 25, an operation-halting control 230, shown at the lower right central portion of the diagram, Fig. 25, as a switch or remote-control device connected through a flexible conduit 231 with the two main leads 202 and 208 at the opposite sides of the generator 200, but beyond the short circuit light 207. While this rug-halting element 230 may be located at any convenient point, the described arrangement is such that it may be held in the hand of the operator or of any person viewing the rugs, the flexible conduit being of adequate length to permit such person to move about and examine the displayed rugs to any desired extent. Merely by pressing the illustrated button switch 230 the generator is short-circuited through the light 207, and accordingly all parts are rendered inoperative. Thus the operator or observer has any rug under his immediate control, whether the operation is at the time manually selective or full automatic. Accordingly, if any rug attracts particular attention, it may be brought to rest at any point in its cycle of movement, for further examination.

In the present application certain subject matter of our invention is claimed both generically and specifically, there being disclosed and claimed in our said co-pending applications other embodiments of our invention, including rug storing and advancing means, and rug-beam drive means; as well as other features capable of use in connection with the mechanism of the present application, including, for example, provision for automatic operation of the apparatus under variable pattern control.

Our invention is not limited to the particular illustrative embodiment herein shown and described, its scope being set forth in the appended claims.

We claim:

1. Apparatus for displaying rugs and the like, comprising in combination, means for individually holding a plurality of rugs in inoperative or stored position, a substantially horizontal display platform spaced vertically from said rug holding means, and power-actuated means to move any rug individually to substantially flat display position on said platform and return.

2. Apparatus for displaying rugs and the like, comprising in combination, means for individually holding a plurality of rugs in inoperative or stored position, a substantially horizontal display platform spaced vertically from said rug holding means, means to move the rugs singly to extended display position on said platform and return, and selective control mechanism for said last-named means.

3. Apparatus for displaying rugs and the like, comprising in combination, means for individually holding a plurality of rugs in inoperative or stored position, a substantially horizontal display platform spaced vertically from said rug holding means, means to move the rugs singly to extended display position on said platform and return, and means for selecting the rug to be displayed and for initiating the display movement and the return movement at will.

4. Apparatus for displaying rugs and the like, comprising in combination, a frame, rotary supports on the frame individually presenting a plurality of rugs in readiness for movement to extended display position, positive drive mechanism for the several rotary supports, to turn them in one direction, assisted by gravity, to let off their rugs and to drive them in the opposite direction to return the rugs, and remote-controllable means selectively to effect turning movement of any desired support thereby to move its rug toward such position of display and return.

5. In a display apparatus for rugs and the like, individual rotary supporting means for a plurality of rugs, a platform at a level below said rotary supporting means, means to select a rug of said plurality for display, and means to extend a selected rug from its supporting means into display position upon said platform.

6. In a display apparatus for rugs and the like, a frame, rotary means on said frame for individually holding a series of rugs in readiness for movement to display them singly, electrical control means associated with the frame whereby the operator may select a rug for display, and motor means controlled thereby to move the selected rug, with the assistance of gravity from its rotary holding means into extended flat display condition and positively to move it, against gravity in the return direction.

7. Rug and the like display apparatus comprising, in combination, rug storage means including a plurality of rotary beams each adapted to support a rug, means to rotate said beams to let off or wind on the respective rugs, and conveyor means to receive any rug as let off and to move it into extended position for display.

8. Apparatus for exhibiting rugs and the like comprising, in combination with a plurality of rugs, a frame including one or more multiple sections, each section supporting a plurality of rotary beam-like storage units, said rotary units in each section disposed at different levels and also spaced lengthwise the machine, a plurality of elongated flexible strip members for attaching one end of each rug to its respective storage unit, said strips being of graduated lengths for the units at different levels, and power-driven means for turning the rotary units to let off and to return their rugs with respect thereto.

9. In an apparatus for displaying rugs and the like, in combination with rotary means for supporting a plurality of rugs to be displayed, conveyor means to receive the leading portion of a rug moving edgewise from supported position and to carry the rug as a whole into flat exposed position for display, means to drive said conveyor means, and automatic means to halt the conveyor means and rug in display position.

10. In an apparatus for displaying rugs and the like, in combination, a support for a plurality of rugs, means to effect edgewise downward movement of any rug from its supported position, and mechanism to receive and change the direction of movement of a descending rug and to extend it flatwise into exposed display position.

11. In an apparatus for displaying rugs and the like, in combination, a support for a plurality of rugs, means to effect edgewise downward movement of any rug from its supported position, mechanism to receive and change the direction of movement of a descending rug and to extend it flatwise into exposed display position, means to select a rug for display, and means to start and stop said receiving and extending mechanism.

12. Rug or the like display apparatus comprising, in combination, rug storing means, means to select a rug from a stored plurality, mechanism to advance a selected rug edgewise to substantially horizontal flat display position, and means to control said operations.

13. Rug or the like display apparatus comprising, in combination, rug storing means, means to select a rug from a stored plurality, mechanism to advance a selected rug to approximately horizontal display position, and manually operative means to control said selecting means and advancing mechanism.

14. Rug or the like display apparatus comprising, in combination, individual beam-like rug storing means, means to select a rug from a stored plurality, mechanism to advance a selected rug to display position, and means automatically to control the selecting means and advancing mechanism to display and return a plurality of rugs in continuous sequence.

15. Rug or the like exhibiting apparatus comprising individual rug storage means, a display platform at a different level from said storage means, mechanism to extend a rug on said display platform, and means to effect a directional change of movement of a rug as it passes from stored to display position.

16. Rug or the like exhibiting apparatus comprising individual rug storage means, a display platform at a different level from said storage means, mechanism to extend a rug on said display platform, means to effect a directional change of movement of a rug as it passes from stored to display position, and selective means to determine the rug to be displayed.

17. Rug or the like exhibiting apparatus comprising individual rug storage means, a display platform at a different level from said storage means, mechanism to extend a rug on said display platform, means to effect a directional change of movement of a rug as it passes from stored to display position, and automatic means to effect successively continuous display of a plurality of rugs.

18. Rug or the like exhibiting apparatus comprising individual rug storage means, a display platform at a different level from said storage means, mechanism to extend a rug on said display platform, means to effect a directional change of movement of a rug as it passes from stored to display position, and optionally manually-selective or full automatic means to control the display and return of the rugs.

19. In an apparatus for exhibiting rugs and the like, a frame, a plurality of beams rotatably supported thereon, each beam comprising a tubular core, pairs of oppositely disposed plates on the core, circumferential series of parallel bars carried by said plates and forming the rug receiving portion of the beams, flexible straps attached to the core between pairs of said plates and adapted to be wound on the core, at the ends of said series of bars, a rug carrier bar at the free ends of said straps and provided with rug attaching means, and aligned notch formations in said plates for receiving said carrier bar in substantially flush relation to the parallel rug-receiving bars when said straps are wound on the core.

20. In a rug display apparatus of the class described, in combination with a display surface, supports for the several rugs, and means to move the rugs from stored to display position and return, a control member movable to positions to initiate the display movement and the return movement respectively, selector mechanism to determine the rug to be displayed including a selector element movable to a plurality of selecting positions respectively corresponding to the rugs to be displayed, and interlocking means intermediate said control member and the selector element, operative on initiation of a display movement by said control member, to prevent subsequent improper movement of the selector element prior to the return of the previously selected rug.

21. In a rug display apparatus of the class described, in combination with a display surface, supports for the several rugs, and means to move the rugs from stored to display position and return, a control member movable to positions to initiate the display movement and the return movement respectively, other means automatically to control the rug movements, and means to render said automatic means operative or inoperative, selector mechanism to determine the rug to be displayed including a selector element movable to a plurality of selecting positions respectively corresponding to the rugs to be displayed, and safety means compelling said control member to be placed in a given position before said automatic means is rendered operative.

22. In a rug display apparatus of the class described, in combination with a display surface, supports for the several rugs, and means to move the rugs from stored to display position and return, a control member movable to positions to initiate the display movement and the return movement respectively, other means automatically to control the rug movements, and means to render said automatic means operative or inoperative, selector mechanism to determine the rug to be displayed including a selector element movable to a plurality of selecting positions respectively corresponding to the rugs to be displayed, interlocking means intermediate said control member and the selector element, operative on initiation of a display movement by said control member, to prevent subsequent improper movement of the selector element prior to the return of the previously selected rug, and safety means compelling said control member to be placed in a given position before said automatic means is rendered operative.

23. In a rug display apparatus of the class described, in combination with a display surface, supports for the several rugs, and means to move the rugs from stored to display position and return, manual means to control the operation of the rug moving means, other means automatically to control said operation, an element movable to condition the apparatus for operation either under control of said manual means or of said automatic means, and locking means to retain said element in manual conditioning position during rug movements under manual control.

24. In a rug display apparatus of the class described, in combination with a display surface, supports for the several rugs, and means to move the rugs from stored to display position and return, manual means to control the operation of the rug moving means, other means automatically to control said operation, an element movable to condition the apparatus for operation either under control of said manual means or of said automatic means, and safety mechanism to prevent shifting of said element from manual to automatic conditioning position during progress of a manually controlled cycle of rug movement.

25. Apparatus for displaying rugs or the like comprising, in combination, a frame, one or more multiple unit frame sections thereon, a plurality of rotary beams on each such section for storing or letting off rugs, means to turn each beam individually including a toothed rotary element operatively associated with each beam, a holding pawl positively engageable with said toothed element to restrain the beam from unwinding movement when a rug is stored thereon, and means to release said pawl at the desired times.

26. Apparatus for displaying rugs or the like comprising in combination, a frame, rotary beams thereon for storing or letting off rugs, and means to turn the beams, each beam comprising an axial member equipped with end bearings, a plurality of radial plates on the axial member, circumferentially disposed sockets in the plates, and a plurality of longitudinal bars extending between adjacent plates and supported in the corresponding sockets thereof to provide a winding drum.

27. Apparatus for displaying rugs or the like comprising, in combination a frame, movable supports thereon for individual rugs, a display surface onto which the rugs are adapted to be extended, said supports for the different rugs being at varying distances from the display surface, and connections between the rugs and their respective supports including elongated flexible connecting members adapted to be received on and let off from the supports, said flexible connecting members being proportioned as to length to provide for display extension of the several rugs in substantially similar position irrespective of the varied distances of the individual supports from the display surface.

28. Apparatus for displaying rugs or the like comprising, in combination, a frame, movable supports thereon for individual rugs, a display surface onto which the rugs are adapted to be extended, and connections between the rugs and their respective supports including elongated flexible connecting members adapted to be received on and let off from the supports and having a length to extend between a support and its rug in the extended display position of the latter.

29. Apparatus for displaying rugs or the like comprising, in combination, a frame, movable supports thereon for individual rugs, a transversely extending carrier or hanger element for each rug, means connecting the hanger element and the respective rug support, and detachable fastener devices releasably to attach a rug to its hanger element, each such device including a holding pin of a length at least that of the rug pile and a locking yoke movable into and out of rug-retaining relation with the pin, adjacent the free ends of the rug pile, whereby the fastener device securely attaches the rug and avoids objectionable marking of the rug pile.

30. Apparatus for displaying rugs or the like comprising, in combination, a frame, movable supports thereon for individual rugs, a transversely extending carrier or hanger element for each rug, means connecting the hanger element and the respective rug support, and detachable fastener devices releasably to attach a rug to its hanger element, each such device including a holding pin of a length at least that of the rug pile and a locking yoke movable into and out of rug-retaining relation with the pin, adjacent the free ends of the rug pile, whereby the fastener device securely attaches the rug and avoids objectionable marking of the rug pile, and means for retaining the yoke in locking position.

31. In an apparatus for displaying rugs or the like, in combination, a storage frame, a plurality of rug supports on said frame, a display platform onto which the rugs are adapted to be extended, mechanism for selecting and moving individual rugs to and from display position on said platform, electric operating means for said mechanism, control mechanism to determine the operative status of said operating means, and a master control element operatively disposed conveniently to said platform for interrupting movement of a rug at any desired point in such movement.

32. In an apparatus for storing and displaying rugs and the like, a supporting frame, a substantially horizontal display surface, individual supports for a plurality of rugs, the several supported rugs normally having their leading portions depending in the plane of their supports and at a position above the level of the display surface, means for moving the rugs substantially vertically from their supports and substantially horizontally onto said display surface, and transversely extending separators for confining the rugs to their respective paths of travel as they approach or return from the display surface level.

33. In an apparatus for storing and displaying rugs and the like, a supporting frame, a substantially horizontal display surface, individual supports for a plurality of rugs, means for moving the rugs substantially vertically from their supports and substantially horizontally onto said display surface, and a series of separating and guiding devices defining the vertical paths of movement for the individual rugs and avoiding interference of one rug with another.

34. Apparatus for displaying rugs or the like comprising, in combination, a storage frame, rotary supports thereon for the several rugs, a display surface onto which the rugs may be extended, mechanism for moving the rugs to and from display position including means to turn the rug supports to let off or wind on the rugs and conveyor means to receive, extend and return the rugs, and drive mechanism for said conveyor means operable at different speeds during different portions of a rug extending and returning cycle.

35. Apparatus for displaying rugs or the like comprising, in combination, a storage frame, rotary supports thereon for the several rugs, a display surface onto which the rugs may be extended, mechanism for moving the rugs to and from display position including means to turn the rug supports to let off or wind on the rugs and conveyor means to receive, extend and return the rugs, and drive mechanism for said conveyor means, including means for changing the speed of the latter.

36. Apparatus for displaying rugs or the like comprising, in combination, a storage frame, rotary supports thereon for the several rugs, a display surface onto which the rugs may be extended, mechanism for moving the rugs to and from display position including means to turn the rug supports to let off or wind on the rugs and conveyor means to receive, extend and return the rugs, and drive mechanism for said conveyor means, including means to operate the conveyor at a given speed in the rug-receiving and extending direction and at a lower speed in the returning direction during at least a part of the returning operation.

37. In a rug or the like display apparatus, in combination, supports for a plurality of rugs, a display surface, motor-driven means to move the rugs individually to display position on said surface and to return them, and electric control means including selecting circuits for determining a rug to be displayed, a control board bearing indicia corresponding to the several rugs and a co-operating index member movable by the operator to condition for operation the selecting circuit for that rug desired for display.

38. In a rug or the like display apparatus, in combination, supports for a plurality of rugs, a display surface, motor-driven means to move the rugs individually to display position on said surface and to return them, and control means for selecting a rug to be displayed, said means including a control board bearing indicia corresponding to the several rugs, a rug-selecting index member movable relatively to the board, and connections controlled by said index member for conditioning a selected rug for display movement.

39. In a rug or the like display apparatus, including means to support a plurality of rugs and motor-driven means to move the rugs individually to display position and return, the combination therewith of a control station for the rug moving means, comprising a selector dial bearing indicia corresponding to the individual rugs, a series of electric contacts corresponding to the indicia, and a pointer movable to positions corresponding to the indicia selectively to establish circuits conditioning the corresponding rug for display movement.

40. In a rug or the like display apparatus, including means to support a plurality of rugs and motor-driven means to move the rugs individually to display position and return, the combination therewith of a control station for the rug moving means, comprising a selector dial bearing indicia corresponding to the individual rugs, a series of electric contacts corresponding to the indicia, a pointer movable to positions corresponding to the indicia selectively to establish circuits conditioning the corresponding rug for display movement, and a switch element for starting the display movement of a selected rug.

41. In a rug or the like display apparatus, including means to support a plurality of rugs and motor-driven means to move the rugs individually to display position and return, the combination therewith of a control station for the rug moving means, comprising a selector dial bearing indicia corresponding to the individual rugs, a series of electric contacts corresponding to the indicia, a pointer movable to positions corresponding to the indicia selectively to establish circuits conditioning the corresponding rug for display movement, means to halt a rug in its display position, and switch means for starting the outgoing or display movement and for initiating the return movement.

42. In a rug or the like display apparatus, including means to support a plurality of rugs and motor-driven means to move the rugs individually to display position and return, the combination therewith of a control station for the rug moving means, comprising a selector dial bearing indicia corresponding to the individual rugs, a series of electric contacts corresponding to the indicia, a pointer movable to positions corresponding to the indicia selectively to establish circuits conditioning the corresponding rug for display movement, means to halt a rug in its display position, switch means for starting the outgoing or display movement and for initiating the return movement, and alternative means, including a switch for rendering it operative or inoperative, for performing said starting, halting and returning movements automatically and in sequence for a plurality of rugs.

43. In a rug or the like display apparatus, including means to support a plurality of rugs and motor-driven means to move the rugs individually to display position and return, the combination therewith of a control station for the rug moving means, comprising a selector dial bearing indicia corresponding to the individual rugs, a series of electric contacts corresponding to the indicia, a pointer movable to positions corresponding to the indicia selectively to establish circuits conditioning the corresponding rug for display movement, means to halt a rug in its display position, switch means for starting the outgoing or display movement and for initiating the return movement, and pilot means for visually indicating the operating status of the apparatus.

44. In a rug or the like display apparatus, including means to support a plurality of rugs and motor-driven means to move the rugs individually to display position and return, the combination therewith of a control station for the rug moving means, comprising a selector dial bearing indicia corresponding to the individual rugs, a series of electric contacts corresponding to the indicia, a pointer movable to positions corresponding to the indicia selectively to establish circuits conditioning the corresponding rug for display movement, means to halt a rug in its display position, switch means for starting the outgoing or display movement and for initiating the return movement, alternative means, including a switch for rendering it operative or inoperative, for performing said starting, halting and returning movements automatically and in sequence for a plurality of rugs, and pilot means for visually indicating the operating status of the apparatus.

45. In a rug or the like display apparatus, including means to support a plurality of rugs and motor-driven means to move the rugs individually to display position and return, the combination therewith of a control station for the rug moving means, comprising a selector dial bearing indicia corresponding to the individual rugs, a series of electric contacts corresponding to the indicia, a pointer movable to positions corresponding to the indicia selectively to establish circuits conditioning the corresponding rug for display movement, means to halt a rug in its display position, switch means for starting the outgoing or display movement and for initiating the return movement, and alternative means, including a switch for rendering it operative or inoperative, for performing said starting, halting and returning movements automatically and in sequence for a plurality of rugs, said automatic means including a ratchet device operatively associated with said movable pointer, and means to step said ratchet device at the termination of a rug display and return movement automatically to condition another rug for display and return.

46. In a rug or the like display apparatus, including means to support a plurality of rugs and motor-driven means to move the rugs individually to display position and return, the combination therewith of a control station for the rug moving means, comprising a selector dial bearing indicia corresponding to the individual rugs, a series of electric contacts corresponding to the indicia, a pointer movable to positions corresponding to the indicia selectively to establish circuits conditioning the corresponding rug for display movement, means to halt a rug in its display position, switch means for starting the outgoing or display movement and for initiating the return movement, alternative means, including a switch for rendering it operative or inoperative, for performing said starting, halting and returning movements automatically and in sequence for a plurality of rugs, said automatic means including a ratchet device operatively associated with said movable pointer, and means to step said ratchet device at the termination of a rug display and return movement automatically to condition another rug for display and return, and lock mechanism to hold the conditioning circuit establishing means in the selected position during any instituted cycle of operation of the apparatus.

47. In an apparatus for displaying rugs and the like over a display surface, a supporting frame, rotary supports thereon for a plurality of wound-on rugs, extensible connections between the inner portions of the rugs and their supports, means to unwind any rug from its support and to convey it to a display position in which the rug is bodily advanced from its support within the limits of said extensible connections, and means to stop each rug in substantially similar display position.

48. In an apparatus for displaying rugs and the like over a display surface, a supporting frame, rotary supports thereon for a plurality of wound-on rugs, extensible connections between the inner portions of the rugs and their supports, means to unwind any rug from its support and to convey it to a display position in which the rug is bodily advanced from its support within the limits of said extensible connections, and means to halt each rug upon said display surface with its trailing edge portion at substantially the same position thereon.

49. In an apparatus for displaying rugs and the like, a supporting frame, rotary supports thereon for a plurality of rugs, means to let off any rug from its support and to convey it to extended display position, the supported rugs in stored position having different lengths of their leading portions extending downwardly, according to the level of their support with respect to that of the display position, and means to stop the several rugs, upon their return from display, in substantially their respective initial or stored positions.

50. In an apparatus for displaying rugs and the like, a supporting frame, rotary supports thereon for a plurality of rugs, means to let off any rug from its support and to convey it to extended display position, some of said rotary supports being at different levels from others, and means operative on return of any rug to stop it with its free end portion at a predetermined level with respect to that of the display position.

51. In an apparatus for displaying rugs and the like, a supporting frame, rotary supports thereon for a plurality of rugs, means to let off any rug from its support and to convey it to extended position with respect to a display surface, some of said rotary supports being at different levels from others, and return stop means to halt the rugs with their respective depending portions extending down to substantially the same level.

52. In a storage and display apparatus for rugs and the like, in combination, a plurality of rug beams, a displaying support for a rug, conveyor means to receive the rugs as let off from the beams and to extend them on said displaying support, carriers for the rugs, connections between the respective carriers and beams, electric drive mechanism for the beams and for the conveyor means, circuit controlling means for said drive mechanism, and means associated with the rug carriers and cooperable with said circuit controlling means to halt a rug upon said displaying support.

53. In a storage and display apparatus for rugs and the like, in combination, a plurality of rug beams, a displaying support for a rug, conveyor means to receive the rugs as let off from the beams and to extend them on said displaying support, connecting means between the rugs and their beams, electric drive mechanism for the beams and for the conveyor means, and circuit controlling means in the path of a rug and its connecting means, to halt the rug in display position.

54. In a storage and display apparatus for rugs and the like, in combination, a plurality of rug beams, a displaying support for a rug, conveyor means to receive the rugs as let off from the beams and to extend them on said displaying support, electric drive mechanism for the beams and for the conveyor means, and a movable control device for actuation by a rug let off from its beam and thereby conditioned to stop the return movement of the rug.

55. In a storage and display apparatus for rugs and the like, in combination, a plurality of rug beams, a displaying support for a rug, conveyor means to receive the rugs as let off from the beams and to extend them on said displaying support, electric drive mechanism for the beams and for the conveyor means, a circuit controlling element, and an operating element therefor mounted for movement and release by each rug respectively to condition said circuit controlling element during the letting off and display of a rug and to actuate said element to halt the rug return movement.

56. In a storage and display apparatus for rugs and the like, in combination, a plurality of rug beams, a displaying support for a rug, conveyor means to receive the rugs as let off from the beams and to extend them on said displaying support, electric drive mechanism for the beams and for the conveyor means, an arm movably positioned in the paths of the several rugs, and a circuit controlling device operable by said arm to halt the movement of a rug in returning from said displaying support.

57. In a storage and display apparatus for rugs and the like, in combination, a plurality of rug beams, conveyor means to receive the rugs as let off from the beams and to extend them for display, electric drive mechanism for the beams and for the conveyor means, and circuit controlling means automatically operable to halt the display movements and the subsequent return movements of the rugs.

58. In an apparatus for displaying rugs and the like, in combination, a frame, a rug supporting beam rotatably mounted on the frame, a rug carrier, releasable clamping means on the carrier for attaching one end of a rug thereto, and a plurality of flexible connecting straps between the carrier and beam adapted for winding onto and letting off from the beam to afford bodily extension of the rug relative to the later, for display purposes.

59. In a storage and display apparatus for rugs and the like, a main frame including uprights and connecting members defining a chamber for the storage of rugs, and one or more rug storage sections of major extent vertically adapted for assembly upon the main frame and in line in the direction from front to rear of the latter, each such section comprising side frames providing bearing support for one or more rotary rug beams.

60. In a storage and display apparatus for rugs and the like, a rug storage section including spaced side frames, said frames being in vertically extended position and inclined in the direction from front to rear of the apparatus, vertically spaced bearing means carried by said side frames, in transverse alignment on the respective frames, demountable rug beams rotatably supported by said bearing means in position to wind on and let off their rugs and driving means for said beams.

61. In a storage and display apparatus for rugs and the like, a rug storage section including spaced side frames of major vertical extent, vertically spaced bearing means carried by said side frames, in transverse alignment on the respective frames, demountable rug beams rotatably supported by said bearing means in position to wind on and let off their rugs, said bearing means for each beam being also horizontally offset from those of another, to afford separate vertical planes for the letting off and winding on of the rugs of the several beams and driving means for each beam.

62. In a rug storage and display apparatus, a frame, transversely aligned bearing means fixedly positioned on the frame in vertically spaced relation, and rug beams rotatably supported by said bearing means, said beams being of different diameters, with those of the larger diameters disposed above the others, for compensating purposes.

63. In a storage and display apparatus for rugs and the like, in combination, a platform affording a rug display area at its fore part, a main frame at the rear of said rug display area of the platform and providing a chamber for rug storage above the level of the latter, an arched decorative element between said frame and the rug display area of the platform, and means on the frame for suspending a plurality of rugs transversely of the apparatus, one behind another, and with a depending portion of the foremost rug positionable so as to be framed by said arched element.

64. Apparatus for displaying rugs and the like, comprising in combination, means for individually holding a plurality of rugs in inoperative or stored position, a substantially horizontal display platform and power-actuated means to move any rug to and from substantially flat individual display position upon said platform.

65. Apparatus for displaying rugs and the like, comprising in combination, means for individually holding a plurality of rugs in inoperative or stored position, power-operated means to move the rugs singly each from its stored position to extended display position and return, and selective control mechanism for said last-named means.

66. Apparatus for displaying rugs and the like, comprising in combination, means for individually holding a plurality of rugs in inoperative or stored position, driven means to move the rugs singly each from its stored position to extended display position and return, and means for selecting the rug to be displayed and for initiating the display movement and the return movement at will.

67. Apparatus for displaying rugs and the like, comprising in combination, means individually presenting a plurality of rugs in readiness for movement to extended display position, and means selectively and automatically to effect movement of any desired rug into such position of display and subsequently to effect return movement thereof.

68. In a display apparatus for rugs and the like, individual supporting means for a plurality of rugs, means selectively to determine a rug of said plurality for display, and means subsequently to extend into substantially horizontal display position the rug so determined.

69. In a display apparatus for rugs and the like, means for individually holding a series of rugs in readiness for movement to display them singly, means whereby the operator may selectively determine the rug to be displayed, in advance of rug movement, and automatic means to move the rug so determined into extended flat display condition and return.

70. Apparatus for exhibiting rugs and the like comprising, in combination with a plurality of rugs, a frame including supporting means for said rugs, and cooperating means to extend flatwise and return any selected rug to and from a substantially horizontal display position.

71. In an apparatus for displaying rugs and the like, in combination with means for supporting a plurality of rugs to be displayed, conveyor means to receive the leading portion of a rug moving edgewise from supported position and to carry the rug as a whole into flat exposed position for display, means to drive said conveyor means, and automatic means to halt the conveyor means and rug in display position.

72. In an apparatus for displaying rugs and the like, in combination, a support for a plurality of rugs, means to effect initial edgewise movement of any rug from its supported position, and mechanism to receive a rug so moved and to extend it flatwise into exposed display position.

73. In an apparatus for displaying rugs and the like, in combination, a support for a plurality of rugs, means to effect initial edgewise movement of any rug from its supported position, mechanism to receive a rug so moved and to extend it flatwise into exposed display position, means to select the rug so to be moved for display, and means to start and stop said receiving and extending mechanism.

74. Rug or the like display apparatus comprising, in combination, a display station whereon a rug may be exposed flatwise and substantially horizontally for examination, a rug storage portion including individual supporting means for a plurality of rugs whereby they are stored at a level differing from that of the display station, means to effect edgewise advance of a selected rug from its stored position toward the display level, and mechanism to shift the path of advance of the rug to conform the latter to the plane of display and to convey it to display position.

75. Rug or the like display apparatus comprising, in combination, rug storing means, means to pre-select a rug to be moved from a stored plurality, mechanism to advance a selected rug from its stored position to display position, and means to control said operations at the will of the operator or automatically.

76. Rug or the like display apparatus comprising, in combination, rug storing means, means to select a rug from a stored plurality, power-driven mechanism to advance a selected rug from its stored position to display position, and means manually operative at the will of the operator to control said selecting means and to initiate operation of the advancing mechanism, and other means to terminate said operation at will.

77. Rug or the like display apparatus comprising, in combination, rug storing means, means to select a rug from a stored plurality, mechanism to advance a selected rug from its stored position to display position, and means automatically to control the selecting means and advancing mechanism to display and return a plurality of rugs in continuous sequence.

78. Apparatus for exhibiting rugs and the like in an extended display position simulating that of normal use, comprising, in combination, individual storage mechanism for a plurality of rugs, spaced vertically from the display position, means to effect movement of a rug from its stored position toward and from the display level, and means operative in the display plane to receive a rug from, extend it and return it to control by said movement effecting means.

79. Apparatus for exhibiting rugs and the like in an extended display position simulating that of normal use, comprising, in combination, individual storage mechanism for a plurality of rugs, spaced vertically from the display position, means to cause a selected rug to be extended toward and away from the display level, and conveyor means operative at the display level to receive, extend and return a rug so extended.

80. Apparatus for exhibiting rugs and the like in an extended display position simulating that of normal use, comprising, in combination, individual storage mechanism for a plurality of rugs, spaced vertically from the display position, means to cause a selected rug to be extended toward and away from the display level, conveyor means operative at the display level to receive, extend and return a rug so extended, and drive mechanism for said extending means and said conveyor means.

81. Rug or the like display apparatus comprising, in combination, rug storing means, means to select a rug from a stored plurality, mechanism to advance a selected rug to display position, and means to control said selecting and advancing means at the will of the operator and optionally to effect automatic sequential display and return of a series of rugs.

82. In an apparatus for displaying rugs and the like, in combination with mechanism for selecting and moving individual rugs to and from display position and electric operating means therefor, a control station positioned conveniently to the operator, and circuit-controlling devices associated with said station for predetermining the rug to be moved and for instituting a cycle of rug movement to and from display position.

83. In an apparatus for displaying rugs and the like, in combination with mechanism for selecting and moving individual rugs to and from display position and electric operating means therefor, a control station positioned conveniently to the operator, and circuit-controlling devices associated with said station for predetermining the rug to be moved, for starting an automatically terminated display movement of the determined rug, and for instituting return movement of the rug.

84. In an apparatus for displaying rugs and the like, in combination with mechanism for selecting and moving individual rugs to and from display position and electric operating means therefor, a control station positioned conveniently to the operator, circuit-controlling devices associated with said station for predetermining the rug to be moved, for starting an automatically terminated display movement of the determined rug, and for instituting return movement of the rug, and other means to interrupt rug movement at any desired point therein.

85. In an apparatus for displaying rugs and the like, in combination with mechanism for selecting and moving individual rugs to and from display position and electric operating means therefor, automatic means for controlling said mechanism and its operating means to display and return a plurality of rugs in predetermined sequence.

86. In an apparatus for displaying rugs and the like, in combination with mechanism for selecting and moving individual rugs to and from display position and electric operating means therefor, a control station positioned conveniently to the operator, and circuit-controlling devices associated with said station optionally for effecting display and return of a selected rug at the will of the operator or for effecting sequential display and return of a plurality of rugs in predetermined sequences.

87. In an apparatus for displaying rugs and the like, in combination with mechanism for selecting and moving individual rugs to and from display position and electric operating means therefor, control mechanism to determine the operative status of said operating means, and means to interrupt operation at will.

88. A display apparatus for rugs and the like, comprising, a frame, supporting means thereon for one or more rugs, and power-operable means to move any selected rug edgewise to bring its leading portion into display plane and then by further movement to extend the rug flatwise in said plane, and the reverse.

89. Apparatus for displaying rugs and the like, comprising, in combination, means for individually holding a plurality of rugs in inoperative or stored position, power-operated means to move the rugs singly each from its stored position to extended display position and return, selective control mechanism for said last-named means, and indicating means for signalling an operative phase of the apparatus.

90. Apparatus for displaying rugs and the like, comprising, in combination, means for individually holding a plurality of rugs in inoperative or stored position, power-operated means to move the rugs singly each from its stored position to extended display position and return, selective control mechanism for said last-named means, and lighting means for subjecting a rug in display position optionally to lamplight and so-called daylight illumination.

91. Apparatus for selectively exhibiting rugs and the like comprising, in combination, rug storage means including a plurality of rotary beams each adapted to support a rug, electrically driven means to rotate said beams to let off or wind on the respective rugs, means for receiving any rug as let off and moving it to extended position for exhibition, and circuit-controlling means to halt the letting off and the winding on action of the rotating means for any beam predeterminedly as appropriate to the particular rug for the given beam.

EDGAR F. HATHAWAY.
WALTER BIXBY.